(12) United States Patent
Sha et al.

(10) Patent No.: US 12,245,171 B2
(45) Date of Patent: Mar. 4, 2025

(54) WIRELESS RESOURCE CONFIGURATION METHOD AND APPARATUS, AND STORAGE MEDIUM

(71) Applicant: ZTE CORPORATION, Guangdong (CN)

(72) Inventors: Xiubin Sha, Shenzhen (CN); Bo Dai, Shenzhen (CN); Ting Lu, Shenzhen (CN); Xu Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 407 days.

(21) Appl. No.: 17/590,347

(22) Filed: Feb. 1, 2022

(65) Prior Publication Data
US 2022/0264490 A1 Aug. 18, 2022

Related U.S. Application Data

(63) Continuation of application No. PCT/CN2020/106591, filed on Aug. 3, 2020.

(30) Foreign Application Priority Data

Aug. 2, 2019 (CN) .......................... 201910720250.5

(51) Int. Cl.
*H04W 56/00* (2009.01)
*H04W 36/00* (2009.01)
*H04W 76/10* (2018.01)
*H04W 76/20* (2018.01)
*H04W 36/08* (2009.01)

(52) U.S. Cl.
CPC ..... *H04W 56/001* (2013.01); *H04W 36/0055* (2013.01); *H04W 76/10* (2018.02); *H04W 76/20* (2018.02); *H04W 36/087* (2023.05)

(58) Field of Classification Search
None
See application file for complete search history.

(56) References Cited

U.S. PATENT DOCUMENTS

| 10,856,217 B1 * | 12/2020 | Young .................. H04W 48/16 |
| 2018/0288746 A1 | 10/2018 | Zhang et al. |
| 2019/0159086 A1 * | 5/2019 | Xu ........................ H04W 76/22 |
| 2019/0166526 A1 | 5/2019 | Xu et al. |

(Continued)

FOREIGN PATENT DOCUMENTS

| CN | 102378112 A | 3/2012 |
| CN | 107172890 A | 9/2017 |

(Continued)

OTHER PUBLICATIONS

Extended European Search Report for EP Appl. No. 20850744.2, dated Jul. 10, 2023 (9 pages).

(Continued)

*Primary Examiner* — Duc T Duong
(74) *Attorney, Agent, or Firm* — Foley & Lardner LLP

(57) ABSTRACT

Provided are a radio resource configuration method and apparatus, and a storage medium. The radio resource configuration method includes receiving time-sensitive communication (TSC) service indication information, where the TSC service indication information includes a TSC clock accuracy indication or an indication of whether a service carried by a user equipment (UE) is a TSC service, and sending clock information.

12 Claims, 16 Drawing Sheets

Receive time-sensitive communication (TSC) service indication information, where the TSC service indication information includes a TSC clock accuracy indication or an indication whether to be a TSC service — S110

Send clock information — S120

(56) References Cited

U.S. PATENT DOCUMENTS

| | | | | |
|---|---|---|---|---|
| 2019/0182800 | A1* | 6/2019 | Park | H04W 76/30 |
| 2020/0059829 | A1* | 2/2020 | Joseph | H04W 36/08 |
| 2020/0120536 | A1* | 4/2020 | Prakash | H04W 72/21 |
| 2020/0267508 | A1* | 8/2020 | Fischer | G01S 5/0205 |
| 2020/0359440 | A1* | 11/2020 | Qiao | H04W 76/11 |
| 2021/0227452 | A1* | 7/2021 | Munz | H04W 76/10 |
| 2021/0337491 | A1* | 10/2021 | Xu | H04W 56/006 |
| 2022/0200733 | A1* | 6/2022 | Toeda | H04L 1/1642 |
| 2022/0210647 | A1* | 6/2022 | Centonza | H04L 63/0236 |
| 2022/0217663 | A1* | 7/2022 | Toeda | H04W 56/0015 |
| 2022/0217664 | A1* | 7/2022 | Toeda | H04W 56/0015 |
| 2022/0303923 | A1* | 9/2022 | Kai | H04W 36/0055 |
| 2024/0129181 | A1* | 4/2024 | Yoo | H04L 41/0668 |

FOREIGN PATENT DOCUMENTS

| | | |
|---|---|---|
| CN | 107277919 A | 10/2017 |
| CN | 107347212 A | 11/2017 |
| CN | 108633070 A | 10/2018 |
| CN | 109257827 A | 1/2019 |
| CN | 111092705 A | 5/2020 |
| WO | WO-2017/101121 A1 | 6/2017 |
| WO | WO-2020/143426 A1 | 7/2020 |

OTHER PUBLICATIONS

Huawei, "Reference Timing Delivery Over F1", 3GPP TSG-RAN3 Meeting #103bis, R3-191917, Apr. 12, 2019, Xi'an, China (2 pages).

Huawei, "TSN Synchronization Requirements and Scenarios", 3GPP TSG-RAN3 Meeting #103, R3-190862, Mar. 1, 2018, Athens, Greece (3 pages).

NTT Docomo Inc., "Time Reference Information Delivery", 3GPP TSG-RAN WG3 #104, R3-192509, May 17, 2019, Reno, NV, USA (8 pages).

Samsung, "Generating and Delivering the Time Reference Information in Split NG-RAN Architecture", 3GPP TSG-RAN WG3 #103bis, R3-191534, Apr. 12, 2019, Xi'an, China (4 pages).

International Search Report and Written Opinion on PCT/CN2020/106591, mailed on Nov. 6, 2020 (14 pages).

Nokia et al., "Details on multiple CG/SPS configurations" 3GPP TSG-RAN WG2 Meeting #106, R2-1907199, May 17, 2019 (4 pages).

ZTE Corporation et al., "Remaining issues for accurate reference timing delivery in TSC" 3GPP TSG-RAN2 meeting #106, R2-1905647, May 17, 2019 (4 pages).

First Office Action for CN Appl. No. 202211020650.3, dated Jul. 26, 2023 (with English translation, 10 pages).

Notice of Grounds of Rejection for JP Appl. No. 2022-506661, dated Jun. 18, 2024 (with English translation, 5 pages).

ZTE Corporation, "Consideration on accurate reference timing delivery by unicast RRC signaling", 3GPP TSG-RAN WG3 #105, R3-193524, Aug. 30, 2019, Ljubljana, Slovenia (3 pages).

Catt, "Discussion on TSC Pattern info transfer," 3GPP TSG-RAN WG3 #103bis; R3-191233; Xi'an, China; Apr. 8-12, 2019 (3 pages).

Ericsson, "Provisioning of UE's TSC traffic pattern related information," 3GPP TSG-RAN WG3 Meeting #104; R3-192896; Reno, USA, May 13-17, 2019 (5 pages).

First Office Action for CN App. No. 202311814045.8 date Jul. 27, 2024 (with English translation, 17 pages).

NTT Docomo, Inc., "Discussion on accurate reference timing delivery from gNB to UE," 3GPP TSG-RAN WG2 #106; R2-1908017; Reno, US; May 13-17, 2019 (19 pages).

Communication pursuant to Article 94(3) EPC for EP Appl. No. 20850744.2, dated Oct. 14, 2024 (6 pages).

* cited by examiner

Receive the clock information sent by a next-generation NodeB  ～S210

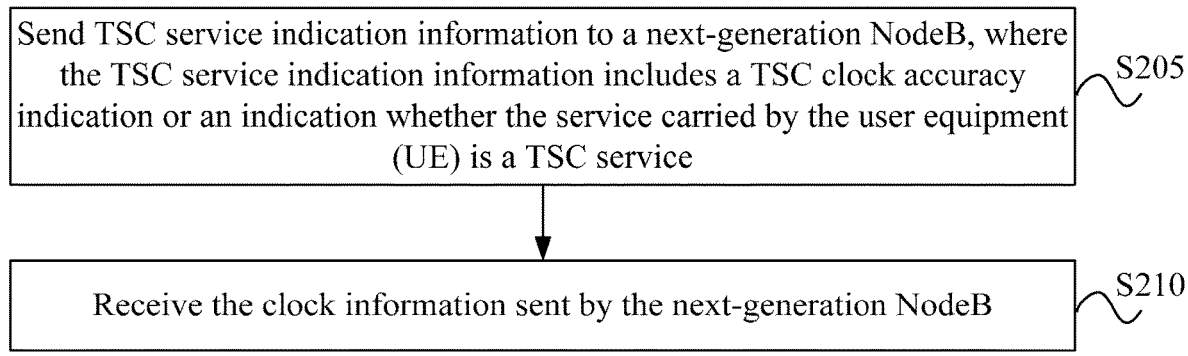
FIG. 14
Send TSC service indication information to a next-generation NodeB ~S310
FIG. 15
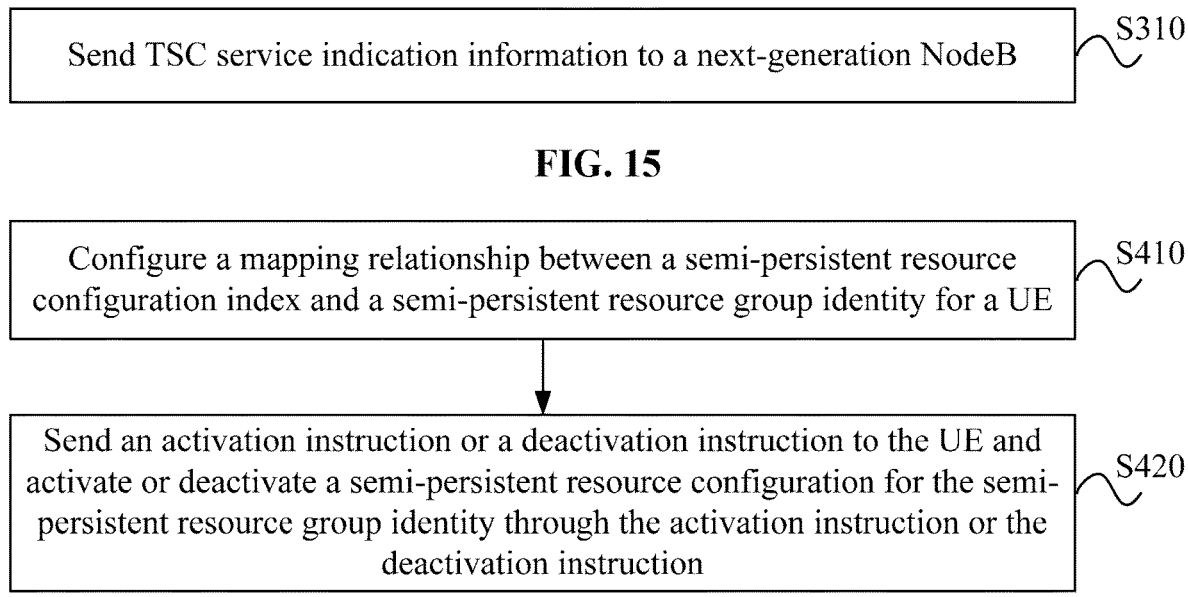
FIG. 16

Represent an SPS configuration index bitmap

Represent an SPS configuration index bitmap

Represent an SPS group identity bitmap

Represent a CG configuration index bitmap

Represent a CG configuration index bitmap

Represent a CG group identity bitmap

WIRELESS RESOURCE CONFIGURATION METHOD AND APPARATUS, AND STORAGE MEDIUM

CROSS-REFERENCE TO RELATED APPLICATIONS

The present application claims the benefit of priority under 35 U.S.C. § 120 as a continuation of PCT Patent Application No. PCT/CN2020/106591, filed on Aug. 3, 2020, which claims priority to Chinese Patent Application No. 201910720250.5 filed on Aug. 2, 2019, the disclosure of each of which is incorporated herein by reference in its entirety.

TECHNICAL FIELD

The present application relates to the field of radio communication networks, for example, a radio resource configuration method and apparatus, and a storage medium.

BACKGROUND

Industrial Internet of Things (IIoT) services generally deliver machine instructions, those services are very sensitive to the delay, and service modes including the transmission cycle and the data packet size are determined. Such services need that a base station achieves accurate clock synchronization with a radio access network, and the services require a small transmission delay. To achieve the accurate clock synchronization between the base station and the radio access network, the base station needs to deliver accurate clock information to a terminal. How to indicate to the base station the clock synchronization requirement of the services carried by a terminal user equipment (UE) and achieve the accurate clock synchronization between the base station and the radio access network is an urgent problem to be solved.

SUMMARY

The present application provides a radio resource configuration method and apparatus, and a storage medium.

Embodiments of the present application provide a radio resource configuration method applied to a base station. The method includes the following.

Time-sensitive communication (TSC) service indication information is received. The TSC service indication information includes a TSC clock accuracy indication or an indication of whether to be a TSC service.

Clock information is sent.

Embodiments of the present application provide a radio resource configuration method applied to a base station. The method includes the following.

A mapping relationship between a semi-persistent resource configuration index and a semi-persistent resource group identity is configured for a UE.

An activation instruction or a deactivation instruction is sent to the UE, and a semi-persistent resource configuration is activated or deactivated for the semi-persistent resource group identity through the activation instruction or the deactivation instruction.

Embodiments of the present application provide a radio resource configuration method applied to a UE. The method includes the following.

Semi-persistent resource configuration information is received. The semi-persistent resource configuration information includes a mapping relationship between a semi-persistent resource configuration index and a semi-persistent resource group identity.

An activation instruction or a deactivation instruction is received, and a semi-persistent resource configuration is activated or deactivated for the semi-persistent resource group identity through the activation instruction or the deactivation instruction.

Embodiments of the present application provide a radio resource configuration method applied to a base station. The method includes the following.

A specified measurement period of a to-be-measured cell is sent to a UE. The specified measurement period is configured for indicating the UE carrying a TSC service to perform a radio quality measurement within the specified measurement period.

The specified measurement period includes a measurement signal sending occasion sequence and a measurement time window.

Embodiments of the present application provide a radio resource configuration method applied to a UE. The method includes the following.

The information about a specified measurement period of a to-be-measured cell is received. The specified measurement period includes a measurement signal sending occasion sequence and a measurement time window.

Radio quality measurement is performed in the specified measurement period.

Embodiments of the present application provide a radio resource configuration apparatus applied to a base station. The apparatus includes a first receiving unit and a first sending unit.

The first receiving unit is configured to receive TSC service indication information. The TSC service indication information includes a TSC clock accuracy indication or an indication of whether to be a TSC service.

The first sending unit is configured to send clock information.

Embodiments of the present application provide a radio resource configuration apparatus applied to a base station. The apparatus includes a configuration unit and a third sending unit.

The configuration unit is configured to configure a mapping relationship between a semi-persistent resource configuration index and a semi-persistent resource group identity for a UE.

The third sending unit is configured to send an activation instruction or a deactivation instruction to the UE and activate or deactivate a semi-persistent resource configuration for the semi-persistent resource group identity through the activation instruction or the deactivation instruction.

Embodiments of the present application provide a radio resource configuration apparatus applied to a UE. The apparatus includes a third receiving unit and a fourth sending unit.

The third receiving unit is configured to receive semi-persistent resource configuration information. The semi-persistent resource configuration information includes a mapping relationship between a semi-persistent resource configuration index and a semi-persistent resource group identity.

The fourth receiving unit is configured to receive an activation instruction or a deactivation instruction and activate or deactivate a semi-persistent resource configuration for the semi-persistent resource group identity through the activation instruction or the deactivation instruction.

Embodiments of the present application provide a radio resource configuration apparatus applied to a base station. The apparatus includes a fourth sending unit.

The fourth sending unit is configured to send a specified measurement period of a to-be-measured cell to a UE. The specified measurement period is configured for indicating the UE carrying a TSC service to perform a radio quality measurement within the specified measurement period.

The specified measurement period includes a measurement signal sending occasion sequence and a measurement time window.

Embodiments of the present application provide a radio resource configuration apparatus applied to a UE. The apparatus includes a fifth receiving unit and a measurement unit.

The fifth receiving unit is configured to receive the information about a specified measurement period of a to-be-measured cell. The specified measurement period includes a measurement signal sending occasion sequence and a measurement time window.

The measurement unit is configured to perform a radio quality measurement in the specified measurement period.

Embodiments of the present application provide a storage medium storing a computer program which, when executed by a processor, causes the processor to perform any method in embodiments of the present application.

According to one technical solution among the preceding technical solutions, the clock synchronization requirement of the service carried by the terminal user equipment (UE) is indicated through the time-sensitive communication (TSC) service indication information and the accurate clock information is delivered to the UE through the base station, so that an accurate clock synchronization of the radio access network is achieved. For a service requiring strong transmission delay sensitivity, it satisfies the delay requirement of the service during transmission in a radio network.

According to another technical solution among the preceding technical solutions, semi-persistent resource configurations with the same activation occasion or deactivation occasion may be taken as one semi-persistent resource configuration group so as to save the overload in resource activation or deactivation.

According to another technical solution among the preceding technical solutions, a specified measurement period of a to-be-measured cell is configured so as to satisfy the transmission delay requirement of a time-sensitive communication service.

The preceding embodiments and other aspects of the present application and implementations thereof are described in more detail in the brief description of drawings, detailed description, and claims.

BRIEF DESCRIPTION OF DRAWINGS

FIG. 14 is a flowchart of a radio resource configuration method applied to a UE according to embodiments of the present application.

FIG. 15 is a flowchart of a radio resource configuration method applied to an AMF according to embodiments of the present application.

FIG. 16 is a flowchart of a radio resource configuration method applied to a base station and used for configuring a semi-persistent scheduling group according to embodiments of the present application.

DETAILED DESCRIPTION

Embodiments of the present application are described hereinafter in conjunction with drawings. It is to be noted that if not in collision, embodiments of the present application and features therein may be combined with each other in any manner.

Figure 1:
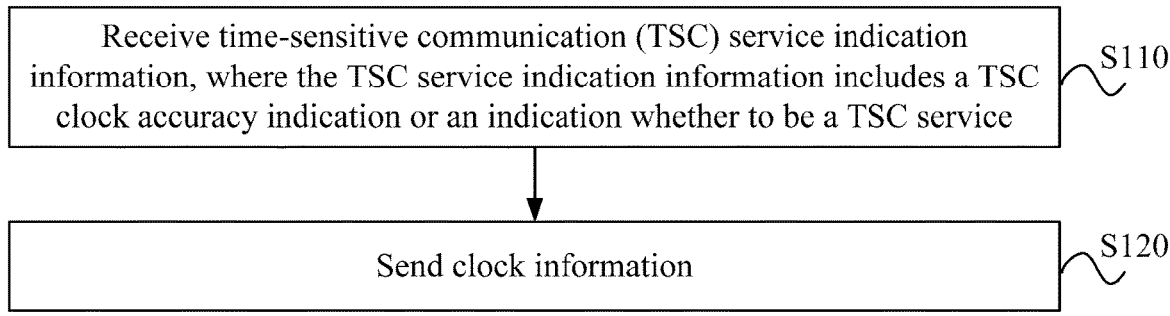
FIG. 1 is a flowchart of a radio resource configuration method applied to a base station according to embodiments of the present application.

FIG. 1 is a message flowchart of a radio resource configuration method according to embodiments of the present application. As shown in FIG. 1, the radio resource configuration method applied to a next-generation NodeB (gNB) includes the following.

In S110, time-sensitive communication (TSC) service indication information is received. The TSC service indication information includes a TSC clock accuracy indication or an indication of whether to be a TSC service.

In S120, clock information is sent.

The clock information is the clock information generated based on the TSC service indication information or an indication that the base station does not support clock delivery.

To achieve the accurate clock synchronization between the base station and a radio access network, the base station needs to deliver accurate clock information to a terminal UE. In embodiments of the present application, the delivery of the accurate clock information may be triggered according to a request sent from the user equipment (UE) or an Access and Mobility Management Function (AMF) module. For example, the UE sends the TSC service indication information to the gNB; alternatively, the AMF sends the TSC service indication information to the gNB.

In one embodiment, receiving TSC service indication information includes one of the following manners: receiving the TSC service indication information sent by the UE; receiving the TSC service indication information sent by the Access and Mobility Management Function (AMF) module; or receiving the TSC service indication information sent by a second base station through dedicated signaling.

For example, in S110, the gNB receives the TSC service indication information from the UE or the TSC service indication information from the AMF. In S120, the gNB sends the accurate clock information to the UE to achieve the accurate clock synchronization between the gNB and the radio access network.

In one embodiment, the TSC service indication information may be the TSC clock accuracy indication indicating the clock accuracy requirement of the service carried by the UE. In another embodiment, the TSC service indication information may be the indication of whether the service carried by the UE is a TSC service. In the preceding two embodiments, the clock synchronization requirement of the service carried by the user equipment (UE) is indicated through the TSC service indication information.

In one embodiment, the clock information includes a specified system frame number (SFN) and the time of the specified SFN endpoint boundary generated based on the TSC service indication information.

The clock information is the clock information whose accuracy is less than one second. The gNB may obtain the clock synchronization requirement of the service carried by the UE based on the received TSC service indication information.

In one example, the gNB acquires its own accurate clock information, for example, the time of the specified SFN endpoint boundary. Based on the accuracy of the clock information corresponding to the clock synchronization requirement of the service carried by the UE, the clock information is generated.

In another example, if the gNB cannot acquire related information or generate the accurate clock information, then the indication that the base station does not support clock delivery will be generated to indicate that the base station does not support accurate clock information synchronization.

In one embodiment, that the TSC service indication information sent by the UE is received includes one of the following manners: The TSC service indication information sent by the UE and carried by a radio link control (RLC) state package is received; the TSC service indication information sent by the UE and carried by a medium access control control element (MAC-CE) is received; the TSC service indication information sent by the UE and carried by a medium access control (MAC) preamble is received; the TSC service indication information sent by the UE and carried by a Packet Data Convergence Protocol (PDCP) state package is received; or the TSC service indication information sent by the UE and carried by a radio resource control (RRC) message is received.

The TSC service indication information sent by the UE to the gNB may be carried by one of the following manners: the RLC state package, the MAC CE, the MAC preamble, the PDCP state package, or the RRC message. Accordingly, the gNB receives the TSC service indication information sent by the UE through one of the preceding manners.

In the case where the TSC service indication is carried by the RLC state package or the PDCP state package, the TSC service indication information in the RLC state package or the TSC service indication information in the PDCP state package needs to be predefined by standards.

In the case where the TSC service indication is carried by the MAC CE, the format of the MAC CE carrying the TSC service indication needs to be predefined.

In the case where the TSC service indication is carried by the MAC preamble, the base station needs to broadcast the preamble resource configured for the TSC service type. When the UE carrying the TSC service selects the preamble resource of the TSC service type, it is considered that the UE requests the TSC service resource from the base station.

In the case where the TSC service indication is carried by the RRC message, the RRC message includes at least one of the following: RRCSystemInfoRequest, RRC RRCSetupRequest, RRCResumeRequest, RRCResumeRequest1, or RRCReestablishmentRequest.

In one embodiment, the receiving TSC service indication information sent by the AMF includes one of the following manners: receiving the TSC service indication information carried by the common signaling of an NG interface; or receiving the TSC service indication information carried by the UE dedicated signaling of the NG interface.

The TSC service indication information sent by the AMF to the gNB may be carried by the UE dedicated signaling of the NG interface or through the common signaling of the NG interface.

Accordingly, the gNB receives the TSC service indication information sent by the AMF through one of the preceding manners. The NG interface is the interface between the radio access network and the 5th generation mobile communication technology (5G) core network.

In one embodiment, the clock information sent to the user equipment (UE) may be carried through one of the following manners: the RLC state package, the MAC CE, downlink control information (DCI), the PDCP state package, downlink RRC signaling, or a broadcast message.

In the case where the accurate clock information is carried by the RLC state package or the PDCP state package, the accurate clock information in the RLC state package or the accurate clock information in the PDCP state package needs to be predefined by standards.

In the case where the TSC service indication is carried by the MAC CE, the format of the MAC CE carrying the accurate clock information needs to be predefined.

In the case where the accurate clock information is carried by the DCI, the format of the DCI carrying the accurate clock information needs to be predefined.

In the case where the accurate clock information is carried by the RRC message, the RRC message includes at least one of the following: an instruction of switching from a New Radio to an Evolved Universal Terrestrial Radio Access Network (E-UTRAN) (MobilityFromNRCommand), RRCReestablishment, RRCReconfiguration, RRCResume, RRCReject, or RRCSetup.

In embodiments of the present application, the clock synchronization requirement of the service carried by the terminal user equipment (UE) is indicated through the time-sensitive communication (TSC) service indication information and the accurate clock information is delivered to the UE through the base station, so that an accurate clock synchronization of the radio access network is achieved. For a service requiring strong transmission delay sensitivity, it satisfies the delay requirement of the service during transmission in a radio network.

In one embodiment, sending the clock information includes: sending the clock information to the UE after the TSC service indication information sent by the UE is received or in the case where cell handover is not needed, sending the clock information to the UE after the TSC service indication information sent by the AMF is received.

Figure 2:
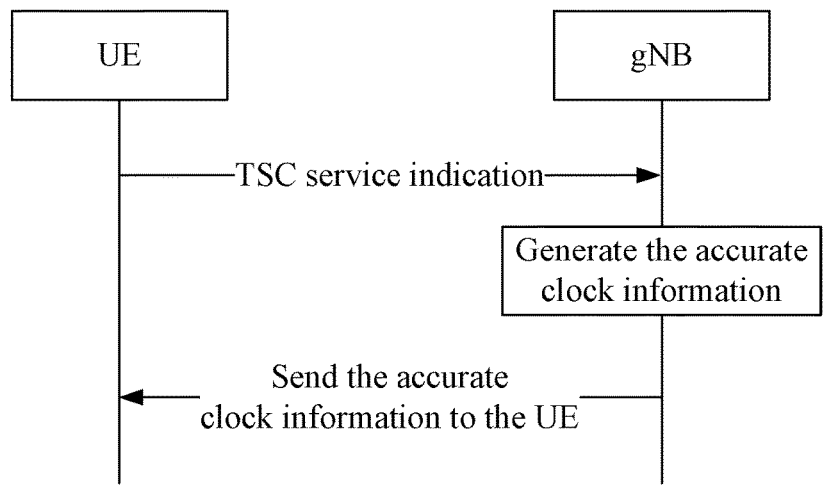
FIG. 2 is a message flowchart of a radio resource configuration method according to embodiments of the present application.

FIG. 2 is a message flowchart of a radio resource configuration method according to embodiments of the present application. As shown in FIG. 2, in one embodiment, the UE sends the TSC service indication information to the gNB, triggering the gNB to generate the accurate clock information. The gNB sends the generated accurate clock information to the UE.

Figure 3:
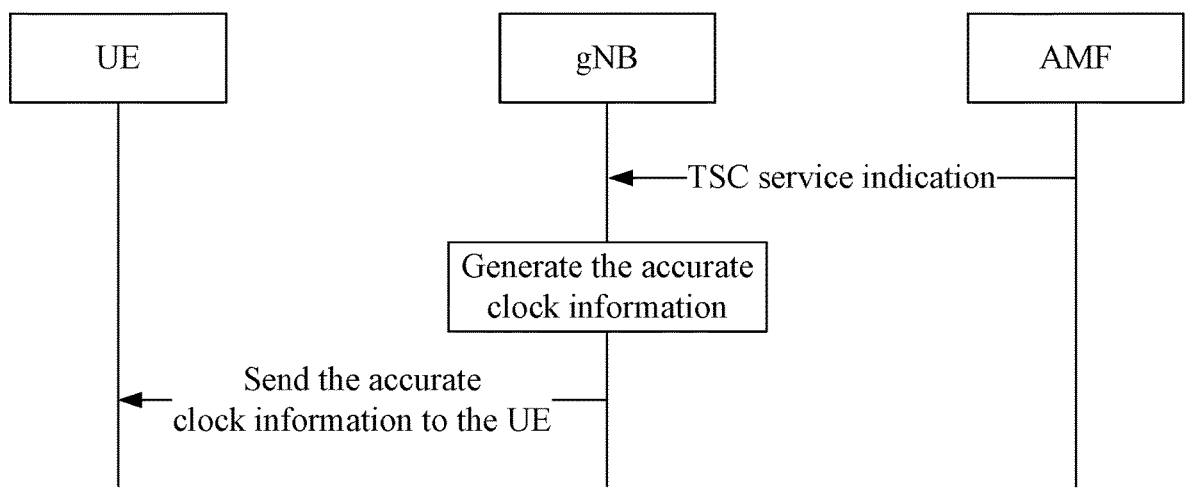
FIG. 3 is a message flowchart of a radio resource configuration method according to embodiments of the present application.

FIG. 3 is a message flowchart of a radio resource configuration method according to embodiments of the present application. As shown in FIG. 3, in one embodiment, the AMF sends the TSC service indication information to the gNB, triggering the gNB to generate the accurate clock information. In the case where cell handover is not needed, gNB sends the generated accurate clock information to the UE.

In one embodiment, sending the clock information includes: sending the TSC service indication information to a target base station of the handover after the TSC service indication information sent by the AMF is received during the cell handover process.

Figure 4:
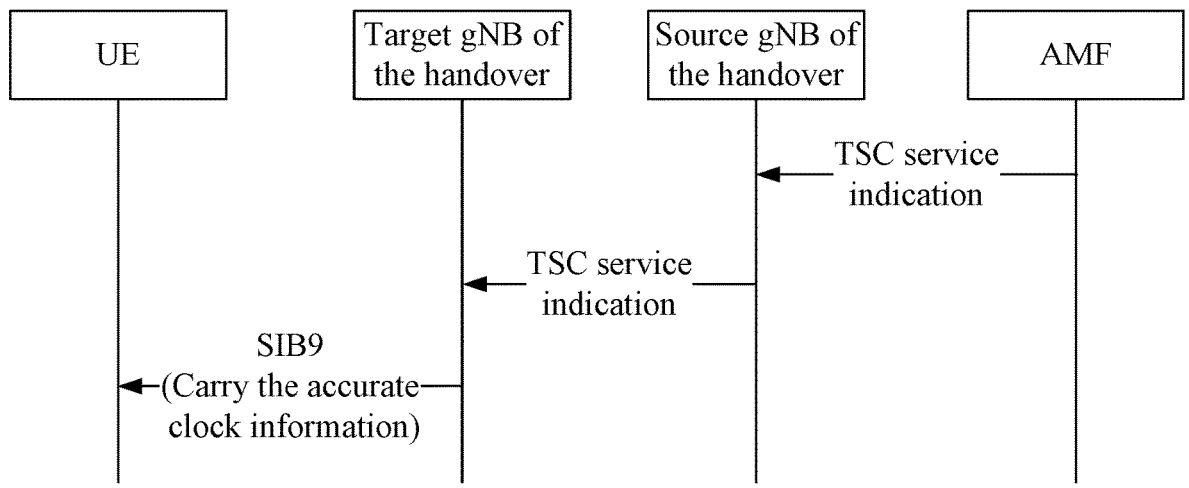
FIG. 4 is a flowchart illustrating that a source cell notifies a target cell of broadcasting accurate clock information during the handover process in a radio resource configuration method according to embodiments of the present application.

FIG. 4 is a flowchart illustrating that a source cell notifies a target cell of broadcasting the accurate clock information during the handover process in a radio resource configuration method according to embodiments of the present application. As shown in FIG. 4, in one embodiment, the AMF sends the TSC service indication information to a source gNB of the handover. In the cell handover process, the source gNB of the handover sends the TSC service indication information to the target gNB of the handover. After receiving the TSC service indication information, the target gNB of the handover sends the accurate clock information to the UE through broadcasting.

In one embodiment, sending the clock information includes: sending the dedicated signaling carrying the TSC service indication information or the dedicated signaling carrying a clock information request to the target base station of the handover after the TSC service indication information sent by the AMF is received during the cell handover process.

Figure 5:
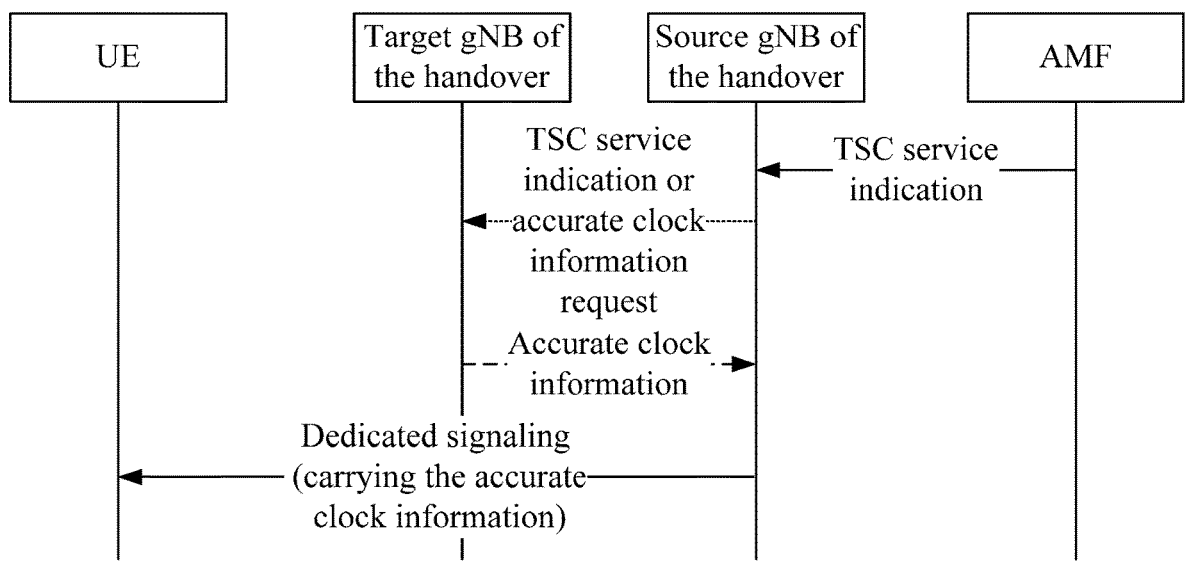
FIG. 5 is a flowchart illustrating that the source cell acquires the accurate clock information from the target cell during the handover process in a radio resource configuration method according to embodiments of the present application.

FIG. 5 is a flowchart illustrating that the source cell acquires the accurate clock information from the target cell during the handover process in a radio resource configuration method according to embodiments of the present application. As shown in FIG. 5, in one embodiment, the AMF sends the TSC service indication information to the source gNB of the handover. During the cell handover process, the source gNB of the handover sends the TSC service indication information or an accurate clock information request message to the target gNB of the handover.

In one embodiment, the method further includes the following.

The TSC service indication information carried by the dedicated signaling is configured for acquiring the clock information of the target base station and sending the clock information to the UE or indicating the target base station of the handover to send the clock information through broadcasting.

Referring to FIG. 5, in this embodiment, the TSC service indication information or the accurate clock information request message is configured for triggering the target gNB of the handover to generate the dedicated signaling carrying the accurate clock information. After receiving the TSC service indication information or the accurate clock information request message, the target gNB of the handover sends the generated accurate clock information to the source gNB of the handover. After receiving the accurate clock information, the source gNB of the handover generates the dedicated signaling carrying the accurate clock information and forwards the dedicated signaling to the UE.

In one embodiment, sending the clock information includes sending the clock information to the source base station of the handover after the TSC service indication information sent by the source base station of the handover or the clock information request sent by the source base station of the handover is received during the cell handover process.

Referring to FIG. 5, after receiving the TSC service indication information sent by the source gNB of the handover or the accurate clock information request message sent by the source gNB of the handover, the target gNB of the handover sends the generated accurate clock information to the source gNB of the handover.

The gNB includes a centralized unit of the next-generation NodeB (gNB-CU) and a distributed unit of the next-generation NodeB (gNB-DU). In one embodiment, the accurate clock information carried by the PDCP state package or the accurate clock information carried by the RRC message comes from the accurate clock information sent by the gNB-DU; alternatively, the gNB-CU acquires its own accurate clock information.

In one embodiment, in the case where the centralized unit of the next-generation NodeB (gNB-CU) and the distributed unit of the next-generation NodeB (gNB-DU) are split, receiving the TSC service indication information sent by the UE includes one of the following manners: receiving, by the gNB-DU, the TSC service indication information carried by the radio link control (RLC) state package, the TSC service indication information carried by the medium access control control element (MAC-CE), and the TSC service indication information carried by the MAC preamble that are sent by the UE; or receiving, by the gNB-CU, the TSC service indication information carried by the Packet Data Convergence Protocol (PDCP) state package, the TSC service indication information carried by the MAC preamble, and the TSC service indication information carried by the radio resource control (RRC) message that are sent by the UE and forwarded by the gNB-DU.

Figure 6:
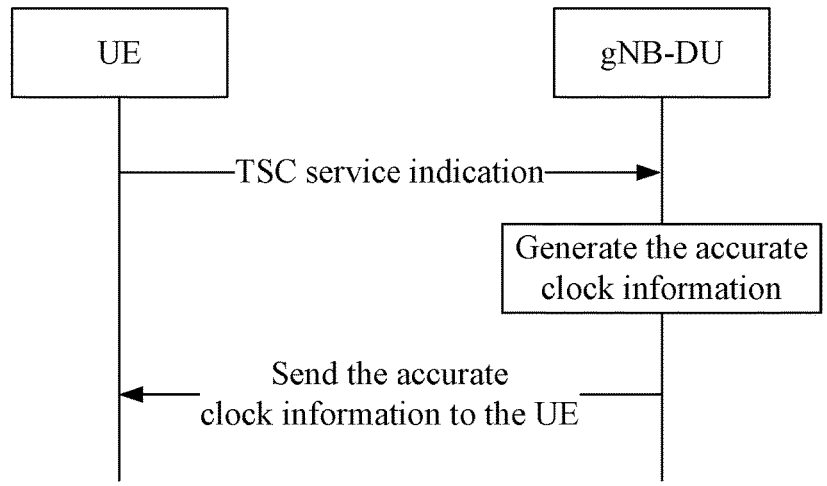
FIG. 6 is a flowchart illustrating that the TSC clock of a Uu interface requests the accurate clock information to be sent through dedicated signaling in a radio resource configuration method according to embodiments of the present application.

FIG. 6 is a flowchart illustrating that the TSC clock of a Uu interface requests the accurate clock information to be sent through the dedicated signaling in a radio resource configuration method according to embodiments of the present application. Referring to FIG. 6, the UE sends the TSC service indication information to the gNB-DU. The TSC service indication information may be carried by one of the RLC state package, the MAC CE, or the MAC preamble. The gNB-DU receives the TSC service indication information through one of the preceding manners.

Figure 8:
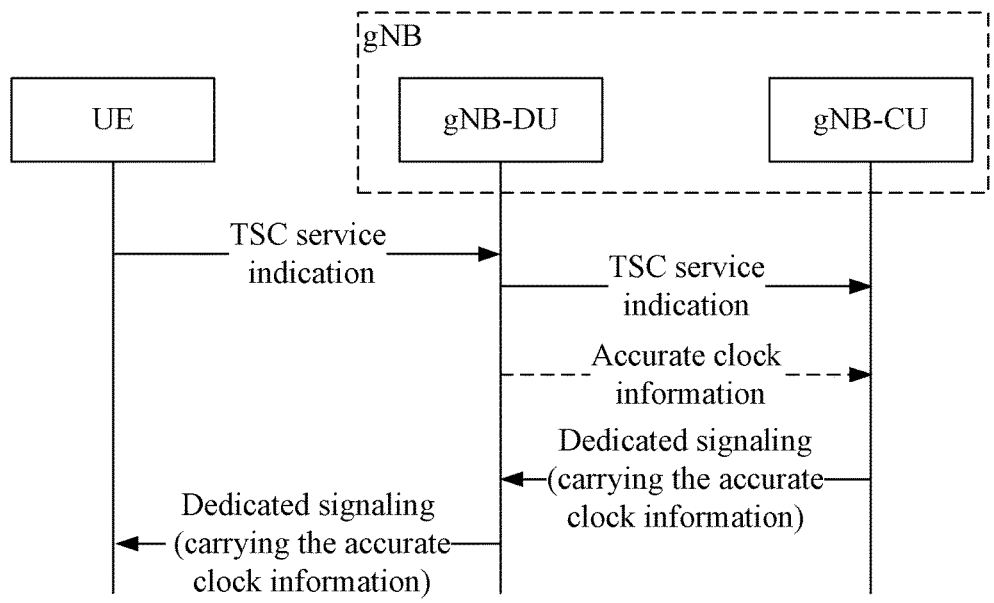
FIG. 8 is a flowchart illustrating that the TSC clock of the Uu interface requests the accurate clock information to be sent through the dedicated signaling in a radio resource configuration method according to embodiments of the present application.
Figure 10:
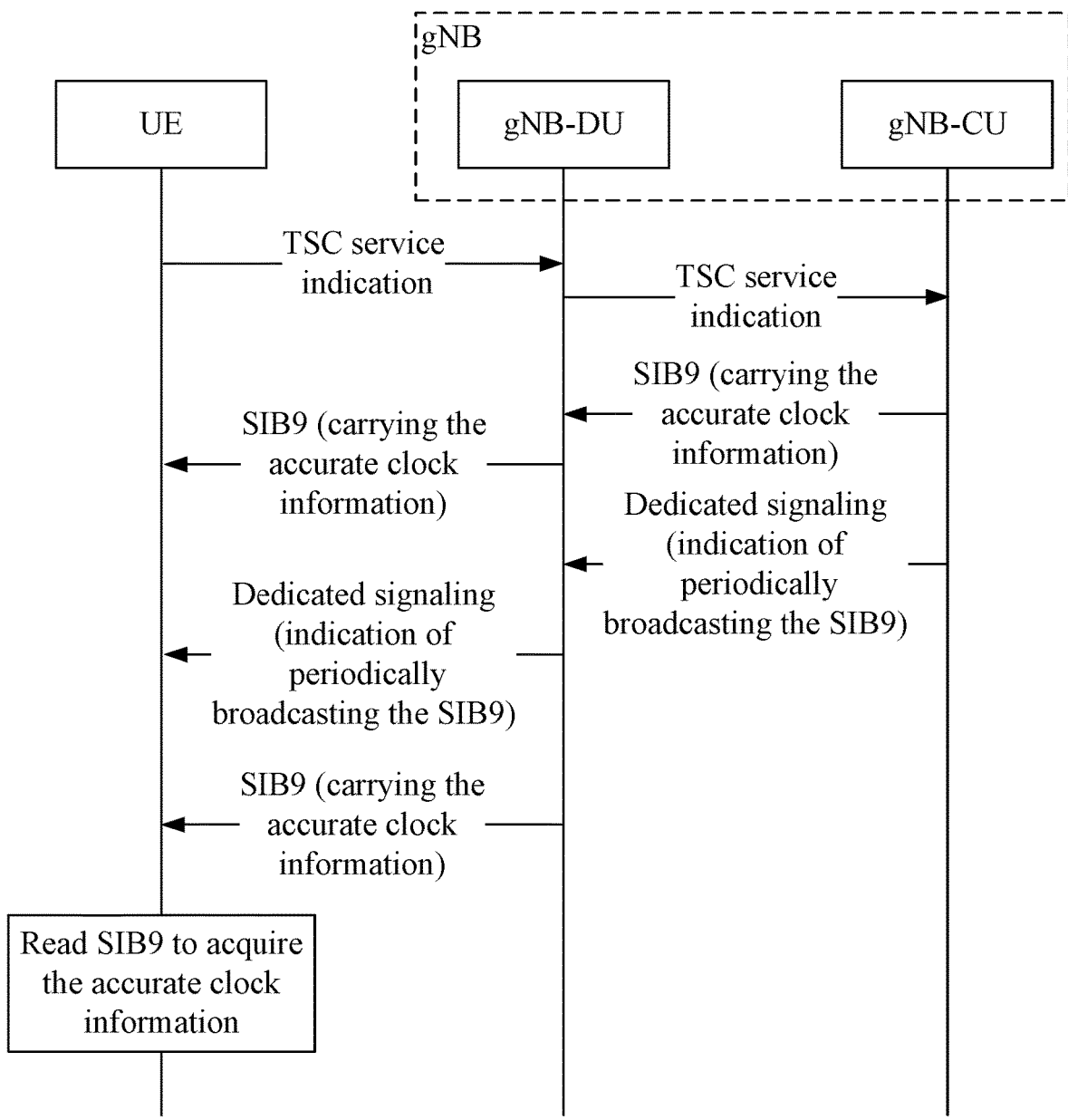
FIG. 10 is a flowchart illustrating that the TSC clock of the Uu interface requests the accurate clock information to be sent through broadcasting in a radio resource configuration method according to embodiments of the present application.

FIG. 8 is a flowchart illustrating that the TSC clock of the Uu interface requests the accurate clock information to be sent through the dedicated signaling in a radio resource configuration method according to embodiments of the present application. FIG. 10 is a flowchart illustrating that the TSC clock of the Uu interface requests the accurate clock information to be sent through broadcasting in a radio resource configuration method according to embodiments of the present application. Referring to FIGS. 8 and 10, the UE sends the TSC service indication information to the gNB-DU. The gNB-DU sends the TSC service indication information to the gNB-CU. The TSC service indication information may be carried by the PDCP state package, the MAC preamble, or the uplink RRC message. The gNB-CU receives the TSC service indication information through one of the preceding manners.

In one embodiment, receiving the TSC service indication information includes: receiving, by the gNB-DU, the TSC service indication information sent by the UE or receiving, by the gNB-CU, the TSC service indication information sent by the AMF and forwarding the TSC service indication information to the gNB-DU.

Sending the clock information to the UE includes: sending, by the gNB-DU, the clock information generated by the gNB-DU to the UE.

In the embodiment shown in FIG. 6, the UE sends the TSC service indication information to the gNB-DU. The TSC service indication information may be carried by one of the RLC state package, the MAC CE, or the MAC preamble. The TSC service indication information may be the TSC clock accuracy indication (indicating the clock accuracy requirement of the service) or the TSC service indication (indicating whether to be a TSC service.)

Referring to FIG. 6, in one embodiment, before the gNB-DU sends the clock information to the UE, the method further includes that the gNB-DU generates the accurate clock information based on the TSC service indication information and the clock of the specified system frame number (SFN) boundary. If the TSC service indication information is the TSC clock accuracy indication or the indication that the service carried by the UE is a TSC service, the gNB-DU generates the needed accurate clock information based on the clock of the specified system frame number (SFN) boundary. In another embodiment, if the gNB-DU cannot acquire related information or generate the accurate clock information, the gNB-DU will generate an indication of not supporting the accurate clock information.

To sum up, the gNB-DU generates the accurate clock information or the indication of not supporting the accurate clock information and then sends the accurate clock information or the indication of not supporting the accurate clock information to the UE. The accurate clock information or the indication of not supporting the accurate clock information may be carried by the RLC state package, the MAC CE, or the DCI.

Figure 7:
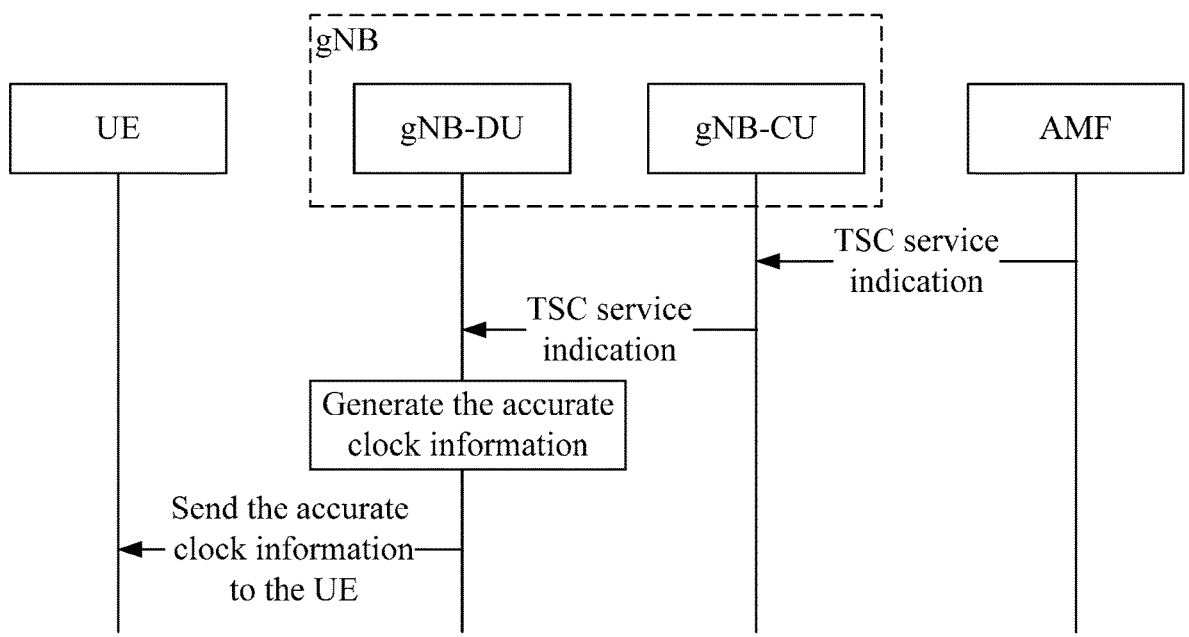
FIG. 7 is a flowchart illustrating that the TSC clock of an NG interface requests the accurate clock information to be sent through the dedicated signaling in a radio resource configuration method according to embodiments of the present application.

FIG. 7 is a flowchart illustrating that the TSC clock of an NG interface requests the accurate clock information to be sent through the dedicated signaling in a radio resource configuration method according to embodiments of the present application. In the embodiment shown in FIG. 7, receiving the TSC service indication information sent by the AMF includes: receiving the TSC service indication information carried by the UE dedicated signaling of the NG interface or through the common signaling of the NG interface and sent by the AMF.

Referring to FIG. 7, the AMF sends the TSC service indication information to the gNB-CU through the UE dedicated signaling of the NG interface. The gNB-CU forwards the TSC service indication information to the gNB-DU through the UE dedicated signaling of an F1 interface. The UE dedicated signaling of the NG interface includes at least one of the following: PAGING, INITIAL CONTEXT SETUP REQUEST, UE CONTEXT RELEASE COMMAND, UE CONTEXT MODIFICATION RESPONSE, HANDOVER REQUEST, PATH SWITCH REQUEST ACKNOWLEDGE, PATH SWITCH REQUEST FAILURE, PDU SESSION RESOURCE SETUP REQUEST, or PDU SESSION RESOURCE MODIFY REQUEST. A packet data unit (PDU) refers to a data unit transferred between peer-to-peer layers. The UE dedicated signaling of the F1 interface includes at least one of the following: PAGING, UE CONTEXT SETUP REQUEST, UE CONTEXT MODIFICATION REQUEST, or SYSTEM INFORMATION DELIVERY COMMAND.

Referring to FIG. 7, in one embodiment, the gNB-DU generates the accurate clock information based on the TSC service indication information from the terminal UE and the clock of the specified system frame number (SFN) boundary. If the TSC service indication information is the TSC clock accuracy indication or the indication that the service carried by the UE is a TSC service, the gNB-DU generates the needed accurate clock information based on the clock of the specified system frame number (SFN) boundary. If the gNB-DU cannot acquire related information or generate the accurate clock information, the gNB-DU will generate the indication of not supporting the accurate clock information.

To sum up, the gNB-DU generates the accurate clock information or the indication of not supporting the accurate clock information and then sends the accurate clock information or the indication of not supporting the accurate clock information to the UE. The accurate clock information or the indication of not supporting the accurate clock information may be carried by the RLC state package, the MAC CE, or the DCI.

In one embodiment, receiving the TSC service indication information includes: receiving, by the gNB-DU, the TSC service indication information sent by the UE and forwarding the TSC service indication information to the gNB-CU or receiving, by the gNB-CU, the TSC service indication information sent by the AMF. Sending the clock information to the UE includes: generating, by the gNB-CU, the dedicated signaling and sending the dedicated signaling to the gNB-DU and sending, by the gNB-DU, the dedicated signaling to the UE.

Figure 9:
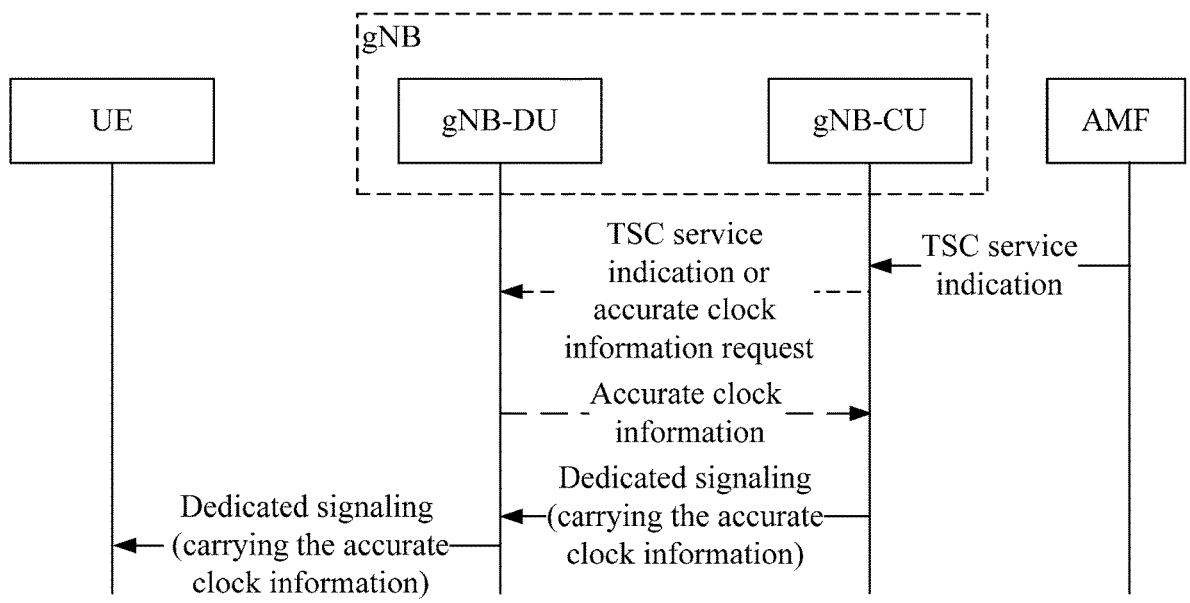
FIG. 9 is a flowchart illustrating that the TSC clock of the NG interface requests the accurate clock information to be sent through the dedicated signaling in a radio resource configuration method according to embodiments of the present application.

FIG. 8 is a flowchart illustrating that the TSC clock of the Uu interface requests the accurate clock information to be sent through the dedicated signaling in a radio resource configuration method according to embodiments of the present application. FIG. 9 is a flowchart illustrating that the TSC clock of the NG interface requests the accurate clock information to be sent through the dedicated signaling in a radio resource configuration method according to embodiments of the present application. In the embodiment shown in FIG. 8, the gNB-CU receives the TSC service indication information sent by the UE and forwarded through the gNB-DU. In the embodiment shown in FIG. 9, the gNB-CU receives the TSC service indication information sent by the AMF. Referring to FIG. 8, in one embodiment, the UE sends the TSC service indication information to the gNB-CU through the gNB-DU. The TSC service indication information may be carried by the PDCP state package, the MAC preamble, or the uplink RRC message. The uplink RRC message includes at least one of the following: RRCSystemInfoRequest, RRCSetupRequest, RRCResumeRequest1, RRCResumeRequest, or RRCReestablishmentRequest.

In one embodiment, the dedicated signaling carries the clock information generated by the gNB-CU. In this embodiment, before the gNB-CU sends the clock information to the gNB-DU, the method further includes that the gNB-CU generates the clock information based on the TSC service indication information and the clock of the specified system frame number (SFN) boundary.

Dotted lines in FIG. 8 indicate an option. In an embodiment with no dotted lines, the gNB-DU sends the TSC service indication information to the gNB-CU. After receiving the TSC service indication information, the gNB-CU generates the accurate clock information or the indication of not supporting the accurate clock information and sends the accurate clock information or the indication of not supporting the accurate clock information to the gNB-DU. Then the gNB-DU forwards the accurate clock information or the indication of not supporting the accurate clock information to the UE. When the accurate clock information is sent, a reference SFN corresponding to the accurate clock information is carried simultaneously. Generating, by the gNB-CU, the accurate clock information includes generating the needed accurate clock information based on the TSC service indication information from the terminal UE and the clock of the moment of the reference SFN boundary.

In one embodiment, on the premise of the clock synchronization between the gNB-CU and the gNB-DU, the gNB-CU acquires its own accurate clock information, generates the dedicated signaling carrying the accurate clock information, and sends the dedicated signaling to the gNB-DU.

In the case where the clock of the gNB-CU and the clock of the gNB-DU are not synchronized, the gNB-CU may request the accurate clock information from the gNB-DU, generate the dedicated signaling carrying the accurate clock information, and send the dedicated signaling to the gNB-DU.

In one embodiment, the method further includes that when forwarding the TSC service indication information to the gNB-CU, the gNB-DU sends the clock information generated by the gNB-DU to the gNB-CU. The gNB-CU generates the dedicated signaling. The dedicated signaling carries the clock information generated by the gNB-DU.

Referring to FIG. 8, this embodiment corresponds to the embodiment with dotted lines in FIG. 8. The case shown by dotted lines indicates that after receiving the TSC service indication from the UE, the gNB-DU triggers the accurate clock information to be sent to the gNB-CU or triggers the indication of not supporting the accurate clock information to be generated and sent to the gNB-CU. The gNB-CU generates the dedicated signaling carrying the accurate clock information or carrying the indication of not supporting the accurate clock information and returns the dedicated signaling to the gNB-DU. Then the gNB-DU sends the dedicated signaling to the UE. When the gNB-DU sends the accurate clock information, the reference SFN corresponding to the accurate clock information is carried simultaneously. The accurate clock information refers to the accurate clock information of the moment of the reference SFN boundary.

Referring to FIG. 8, as mentioned above, the gNB-DU sends the accurate clock information or the indication of not supporting the accurate clock information to the UE. The sending may be carried by one of the PDCP state package or the downlink RRC signaling. A downlink RRC message includes at least one of the following: MobilityFromNR-Command, RRCReestablishment, RRCReconfiguration, RRCResume, RRCReject, or RRCSetup.

In the embodiment shown in FIG. 9, the AMF sends the TSC service indication information to the gNB-CU through the UE dedicated signaling of the NG interface. The UE dedicated signaling of the NG interface includes at least one of the following: PAGING, INITIAL CONTEXT SETUP REQUEST, UE CONTEXT RELEASE COMMAND, UE CONTEXT MODIFICATION RESPONSE, HANDOVER REQUEST, PATH SWITCH REQUEST ACKNOWLEDGE, PATH SWITCH REQUEST FAILURE, PDU SESSION RESOURCE SETUP REQUEST, or PDU SESSION RESOURCE MODIFY REQUEST.

Dotted lines in FIG. 9 indicate an option. The case shown by no dotted line indicates that after receiving the TSC service indication information from the AMF, the gNB-CU generates the accurate clock information or the indication of not supporting the accurate clock information and sends the accurate clock information or the indication of not supporting the accurate clock information to the gNB-DU. Then the gNB-DU forwards the accurate clock information or the indication of not supporting the accurate clock information to the UE. When the gNB-CU sends the accurate clock information, the reference SFN corresponding to the accurate clock information is carried simultaneously. Generating the accurate clock information by the gNB-CU includes: generating the needed accurate clock information based on the TSC service indication information from the UE and the clock of the moment of the reference SFN boundary.

In one embodiment, the method further includes the following.

After receiving the TSC service indication information sent by the AMF, the gNB-CU forwards the TSC service indication information to the gNB-DU or sends the clock information request to the gNB-DU. After receiving the TSC service indication information or the clock information request, the gNB-DU sends the clock information generated by the gNB-DU to the gNB-CU. The dedicated signaling carries the clock information generated by the gNB-DU.

Referring to FIG. 9, the above corresponds to the embodiment with dotted lines in FIG. 9. In the example of FIG. 9, that the gNB-DU sends the accurate clock information to the gNB-CU or generates the indication of not supporting the accurate clock information and sends the indication of not supporting the accurate clock information to the gNB-DU may be triggered through one of the following manners: After receiving the TSC service indication from the gNB-CU, the gNB-DU sends the accurate clock information or the indication of not supporting the accurate clock information; or after receiving the clock information request from the gNB-CU, the gNB-DU sends the accurate clock information or the indication of not supporting the accurate clock information.

In response to the TSC service indication or the clock information request, the gNB-DU sends the accurate clock information to the gNB-CU or generates the indication of not supporting the accurate clock information and sends the indication of not supporting the accurate clock information to the gNB-CU. The gNB-CU generates the dedicated signaling carrying the accurate clock information and returns the dedicated signaling to the gNB-DU. Then the gNB-DU forwards the dedicated signaling to the UE. When the accurate clock information is sent, the reference SFN corresponding to the accurate clock information is carried simultaneously. The accurate clock information refers to the accurate clock information of the moment of the reference SFN boundary.

In one embodiment, after receiving the TSC service indication information or the clock information request, sending, by the gNB-DU, the clock information generated by the gNB-DU to the gNB-CU further includes the following.

The gNB-DU periodically generates the clock information and periodically sends the generated clock information to the gNB-CU. Alternatively, the gNB-DU generates the clock information and sends the generated clock information to the gNB-CU.

In one embodiment, the clock information may be periodically generated by the gNB-DU and periodically sent to the gNB-CU. In another embodiment, after receiving the TSC service indication information each time, the gNB-DU generates the clock information once and sends the generated clock information to the gNB-CU.

Referring to FIG. 9, the gNB-DU sends the accurate clock information or the indication of not supporting the accurate clock information to the UE. The sending may be carried by the PDCP state package or the downlink RRC signaling. The downlink RRC message includes at least one of the following: MobilityFromNRCommand, RRCReestablishment, RRCReconfiguration, RRCResume, RRCReject, or RRC Setup.

FIG. 10 is a flowchart illustrating that the TSC clock of the Uu interface requests the accurate clock information to be sent through broadcasting in a radio resource configuration method according to embodiments of the present application. In the embodiment shown in FIG. 10, the UE sends the TSC service indication information to the gNB-DU. The TSC service indication information may be carried by the PDCP state package, the MAC preamble, or the uplink RRC message. The uplink RRC message includes at least one of the following: RRCSystemInfoRequest, RRCSetupRequest, RRCResumeRequest1, RRCResumeRequest, RRCReestablishmentRequest, or FailureInformation.

In one embodiment, before the clock information is sent to the UE, the method further includes that the gNB-CU sends the clock information carried by a system information block 9 (SIB9) and sends a periodic clock information broadcast indication to the gNB-DU through the dedicated signaling.

Referring to FIG. 10, the gNB-DU sends the TSC service indication information to the gNB-CU and triggers the gNB-CU to periodically broadcast the SIB9 carrying the accurate clock information. In one embodiment, an indication of periodically broadcasting the SIB9 may be carried in a SIB1. The SIB1 is configured for cell access information and the scheduling information of SIBs (except SIB1). The SIB9 is configured for the related information carrying a home eNB (HeNB).

Referring to FIG. 10, the gNB-CU carries the SIB9 carrying the accurate clock information and periodically sends the SIB9 to the gNB-DU. Moreover, the indication of periodically broadcasting the SIB9 carrying the accurate clock information is carried in downlink dedicated signaling.

In one embodiment, the method further includes that after receiving the periodic clock information broadcast indication, the gNB-DU reconstructs clock information carried in the SIB9 generated by the gNB-CU, writes the clock information carried in the SIB9 as the time of the specified SFN endpoint boundary based on the acquisition of its own clock information, and sends the SIB9 to the UE through broadcasting.

Referring to FIG. 10, the gNB-DU periodically broadcasts the SIB9 carrying the accurate clock information. The accurate clock information broadcasted by the gNB-DU includes the specified system frame number (SFN). The gNB-DU may update the clock information in the SIB9 based on the broadcast occasion of the SIB9 and then send the updated SIB9 to the UE through broadcasting. Moreover, the gNB-DU sends the indication of periodically broadcasting the SIB9 carrying the accurate clock information to the UE through the downlink dedicated signaling.

In one embodiment, the gNB-DU sends the periodic clock information broadcast indication of the SIB9 carrying the clock information to the UE through the dedicated signaling.

Referring to FIG. 10, the gNB-DU periodically sends the clock information to the UE through the SIB9 and simultaneously sends the indication of periodically broadcasting the SIB9 carrying the clock information to the UE. The UE reads the clock information in the SIB9 and acquires an accurate system clock. That the UE reads the clock information in the SIB9 may be triggered by the indication, in the downlink dedicated signaling, of periodically broadcasting the SIB9 carrying the accurate clock information or triggered based on the implementation behavior of the UE. For example, when needing the accurate system clock, the UE actively reads the clock information in the received SIB9 to acquire the accurate system clock. The downlink dedicated signaling includes at least one of the following: the PDCP state package, the MAC CE, the DCI, or the downlink RRC signaling. The downlink RRC message includes at least one of the following: MobilityFromNRCommand, RRCReestablishment, RRCReconfiguration, RRCResume, RRCReject, or RRCSetup.

Figure 11:
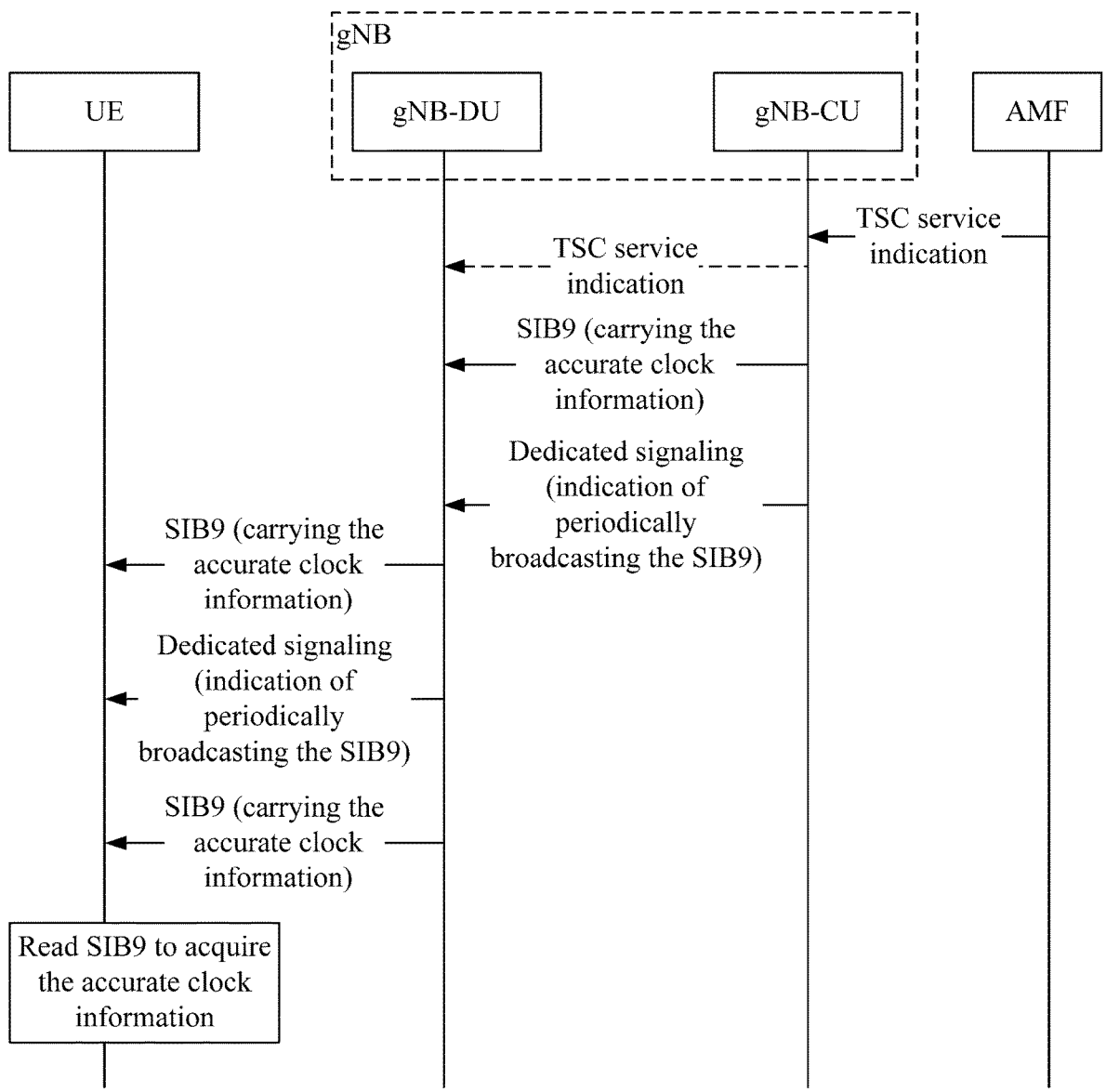
FIG. 11 is a flowchart illustrating that the TSC clock of the NG interface requests the accurate clock information to be sent through broadcasting in a radio resource configuration method according to embodiments of the present application.

FIG. 11 is a flowchart illustrating that the TSC clock of the NG interface requests the accurate clock information to be sent through broadcasting in a radio resource configuration method according to embodiments of the present application. In the embodiment shown in FIG. 11, the AMF sends the TSC service indication information to the gNB-CU through the UE dedicated signaling of the NG interface. The UE dedicated signaling of the NG interface includes at least one of the following: PAGING, INITIAL CONTEXT SETUP REQUEST, UE CONTEXT RELEASE COMMAND, UE CONTEXT MODIFICATION RESPONSE, HANDOVER REQUEST, PATH SWITCH REQUEST ACKNOWLEDGE, PATH SWITCH REQUEST FAILURE, PDU SESSION RESOURCE SETUP REQUEST, or PDU SESSION RESOURCE MODIFY REQUEST.

Referring to FIG. 11, the gNB-CU receives the TSC service indication information from the AMF, triggering the gNB-CU to send the TSC service indication information to the gNB-DU and simultaneously triggering the gNB-CU to periodically broadcast the SIB9 carrying the accurate clock information. In one embodiment, the indication of periodically broadcasting the SIB9 may be carried in the SIB1. That the gNB-CU sends the TSC service indication information to the gNB-DU, as shown in dotted lines in FIG. 11, is an option. In one embodiment, the preceding option may be omitted. When receiving the TSC service indication information from the AMF, the gNB-CU is only triggered to periodically broadcast the SIB9 carrying the accurate clock information.

Referring to FIG. 11, the gNB-CU carries the SIB9 with the accurate clock information and periodically sends the SIB9 to the gNB-DU. Moreover, the indication of periodically broadcasting the SIB9 carrying the accurate clock information is carried in the downlink dedicated signaling. Referring to FIG. 11, after receiving the preceding indication, the gNB-DU periodically broadcasts the SIB9 carrying the accurate clock information. The accurate clock information broadcasted by the gNB-DU includes the specified system frame number (SFN). The gNB-DU may update the clock information in the SIB9 based on the broadcast occasion of the SIB9. The gNB-DU reconstructs the SIB9-carried clock information generated by the gNB-CU, writes the SIB9-carried clock information as the time of the specified system frame number (SFN) endpoint boundary based on the acquisition of its own clock information, and sends the SIB9 to the UE through broadcasting. Moreover, the gNB-DU sends the indication of periodically broadcasting the SIB9 carrying the accurate clock information to the UE through the downlink dedicated signaling.

The UE reads the clock information in the SIB9 and acquires the accurate system clock. That the UE reads the clock information in the SIB9 may be triggered by the indication, in the downlink dedicated signaling, of periodically broadcasting the SIB9 carrying the accurate clock information or triggered based on the implementation behavior of the UE. For example, when needing the accurate system clock, the UE actively reads the clock information in the received SIB9 to acquire the accurate system clock. The downlink dedicated signaling includes at least one of the following: the PDCP state package, the MAC CE, the DCI, or the downlink RRC signaling. The downlink RRC message includes at least one of the following: MobilityFromNRCommand, RRCReestablishment, RRCReconfiguration, RRCResume, RRCReject, or RRCSetup.

Figures 12, 13:
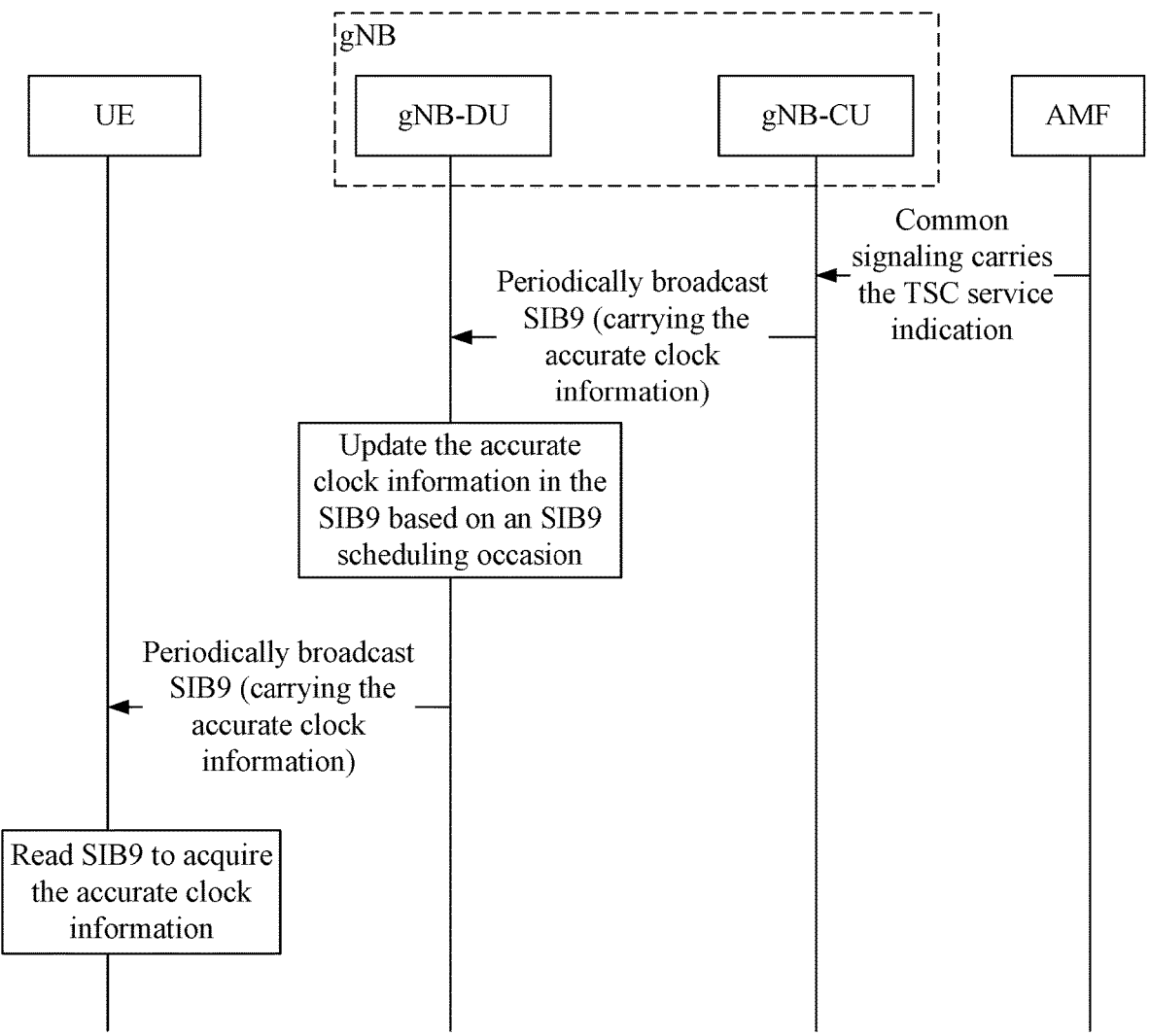
FIG. 12 is a flowchart illustrating that the common signaling of the NG interface requests the accurate clock information to be sent through broadcasting in a radio resource configuration method according to embodiments of the present application.
FIG. 13 is a flowchart of a radio resource configuration method applied to a UE according to embodiments of the present application.

FIG. 12 is a flowchart illustrating that the common signaling of the NG interface requests the accurate clock information to be sent through broadcasting in a radio resource configuration method according to embodiments of the present application. In the embodiment shown in FIG. 12, the AMF sends the TSC service indication information to the gNB-CU through the common signaling of the NG interface. The common signaling of the NG interface includes at least one of the following: NG SETUP RESPONSE, RAN CONFIGURATION UPDATE ACKNOWLEDGE, AMF CONFIGURATION UPDATE, or AMF STATUS INDICATION.

Referring to FIG. 12, the gNB-CU carries the SIB9 carrying the accurate clock information and periodically sends the SIB9 to the gNB-DU. The gNB-DU periodically broadcasts the SIB9 carrying the accurate clock information. The accurate clock information broadcasted by the gNB-DU includes the specified system frame number (SFN). The gNB-DU may update the clock information in the SIB9 based on the broadcast occasion of the SIB9. The gNB-DU reconstructs the SIB9-carried clock information generated by the gNB-CU, writes the SIB9-carried clock information as the time of the specified system frame number (SFN) endpoint boundary based on the acquisition of its own clock information, and sends the SIB9 to the UE through broadcasting. The UE reads the clock information in the SIB9 and acquires the accurate system clock. That the UE reads the clock information in the SIB9 may be triggered by the indication, in the downlink dedicated signaling, of periodically broadcasting the SIB9 carrying the accurate clock information or triggered based on the implementation behavior of the UE. For example, when needing the accurate system clock, the UE actively reads the clock information in the received SIB9 to acquire the accurate system clock. The downlink dedicated signaling includes at least one of the following: the PDCP state package, the MAC CE, the DCI, or the downlink RRC signaling. The downlink RRC message includes at least one of the following: MobilityFromNRCommand, RRCReestablishment, RRCReconfiguration, RRCResume, RRCReject, or RRCSetup.

In one embodiment, sending the clock information to the user equipment (UE) includes sending the clock information in any one of the following manners: the radio link control (RLC) state package, the medium access control control element (MAC-CE), the downlink control information (DCI), the Packet Data Convergence Protocol (PDCP) state package, the radio resource control (RRC) message, or the broadcast message.

In the case where the accurate clock information is carried by the RLC state package or the PDCP state package, the accurate clock information in the RLC state package or the accurate clock information in the PDCP state package needs to be predefined by standards.

In the case where the TSC service indication is carried by the MAC CE, the format of the MAC CE carrying the accurate clock information needs to be predefined.

In the case where the accurate clock information is carried by the DCI, the format of the DCI carrying the accurate clock information needs to be predefined.

In the case where the accurate clock information is carried by the RRC message, the RRC message includes at least one of the following: MobilityFromNRCommand, RRCReestablishment, RRCReconfiguration, RRCResume, RRCReject, or RRCSetup.

FIG. 13 is a flowchart of a radio resource configuration method applied to a UE according to embodiments of the present application. As shown in FIG. 13, the radio resource configuration method applied to a UE according to embodiments of the present application includes the following.

In S210, the clock information sent by a base station is received.

The clock information includes a specified system frame number (SFN) and the time of a specified SFN endpoint boundary generated based on TSC service indication information. The clock information is the clock information whose accuracy is less than one second.

Referring to the embodiments shown in FIGS. 3, 4, 5, 7, 9, 11, and 12, the UE receives the clock information sent by the base station. Based on the time of the specified SFN endpoint boundary in the clock information, the accurate clock synchronization between the base station and the radio access network is achieved. For a service with strong transmission delay sensitivity, it satisfies the delay requirement of the service during transmission in a radio network.

FIG. 14 is a flowchart of a radio resource configuration method applied to a UE according to embodiments of the present application. As shown in FIG. 14, in one embodiment, S210 includes the following before the clock information sent by the base station is received.

In S205, the TSC service indication information is sent to the base station. The TSC service indication information includes a TSC clock accuracy indication or an indication of whether the service carried by the user equipment (UE) is a TSC service.

Referring to the embodiments shown in FIGS. 2, 6, 8, and 10, the UE sends the TSC service indication information to the gNB. The gNB generates the accurate clock information based on the TSC service indication information and sends the accurate clock information to the UE.

In one embodiment, that the clock information sent by the base station is received includes one of the following: The clock information sent by the base station through broadcasting is received; the clock information sent by the base station through dedicated signaling is received; or the periodic clock information broadcast indication sent by the base station through the dedicated signaling is received and the clock information sent by the base station through broadcasting is triggered to be received based on the clock information broadcast indication.

In the embodiment shown in FIG. 8, the UE receives the clock information sent by the base station through the dedicated signaling. In the embodiment shown in FIG. 8, the UE receives the periodic clock information broadcast indication sent by the base station through the dedicated signaling and is triggered to receive the clock information sent by the base station through broadcasting based on the clock information broadcast indication.

In one embodiment, sending the TSC service indication information to the base station includes: sending the TSC service indication information in any one of the following manners: an RLC state package, a MAC CE, a MAC preamble, a PDCP state package, or an RRC message.

The TSC service indication information sent by the UE to the gNB may be carried by one of the following manners: the RLC state package, the MAC CE, the MAC preamble, the PDCP state package, or the RRC message.

In the case where the TSC service indication is carried by the RLC state package or the PDCP state package, the TSC service indication information in the RLC state package or the TSC service indication information in the PDCP state package needs to be predefined by standards.

In the case where the TSC service indication is carried by the MAC CE, the format of the MAC CE carrying the TSC service indication needs to be predefined.

In the case where the TSC service indication is carried by the MAC preamble, the base station needs to broadcast the preamble resource configured for the TSC service type. When the UE carrying the TSC service selects the preamble resource of the TSC service type, it is considered that the UE requests the TSC service resource from the base station.

In the case where the TSC service indication information is carried by the RRC message, the RRC message includes at least one of the following: RRCSystemInfoRequest, RRCSetupRequest, RRCResumeRequest, RRCResumeRequest1, or RRCReestablishmentRequest.

The specific implementation of a radio resource configuration method applied to a UE in embodiments of the present application may be referred to the related description of the preceding radio resource configuration method applied to a base station and is not repeated here.

FIG. 15 is a flowchart of a radio resource configuration method applied to an AMF according to embodiments of the present application. As shown in FIG. 15, the radio resource configuration method applied to an AMF according to embodiments of the present application includes the following.

In S310, TSC service indication information is sent to a base station. The TSC service indication information includes a TSC clock accuracy indication or an indication of whether the service carried by a UE is a TSC service. The TSC service indication information triggers the base station to generate clock information and send the clock information to the UE.

Referring to the embodiments shown in FIGS. 3, 4, 5, 7, 9, 11, and 12, the AMF sends the TSC service indication information to the gNB. The gNB generates the accurate clock information based on the TSC service indication information and sends the accurate clock information to the UE. The clock information includes a specified system frame number (SFN) and the time of a specified SFN endpoint boundary generated based on the TSC service indication information. The clock information is the clock information whose accuracy is less than one second. The UE receives the clock information sent by the base station. Based on the time of the specified SFN endpoint boundary in the clock information, the accurate clock synchronization between the base station and the radio access network is achieved. For a service with strong transmission delay sensitivity, it satisfies the delay requirement of the service during transmission in a radio network. In one embodiment, that the TSC service indication information is sent to the base station includes that the TSC service indication information is sent in any one of the following manners: the dedicated signaling of an NG interface or the common signaling of the NG interface.

Referring to the embodiments shown in FIGS. 3, 4, 5, 7, 9, 11, and 12, the TSC service indication information sent by the AMF to the gNB may be carried by the dedicated signaling of the NG interface or the common signaling of the NG interface. The NG interface is the interface between the radio access network and the 5th generation mobile communication technology (5G) core network.

In one embodiment, the base station includes a gNB-CU. That the TSC service indication information is sent to the base station includes that the TSC service indication information is sent to the gNB-CU.

Referring to the embodiments shown in FIGS. 7, 9, 11, and 12, the AMF sends the TSC service indication information to the gNB-CU.

The specific implementation of a radio resource configuration method applied to an AMF in embodiments of the present application may be referred to the related description of the preceding radio resource configuration method applied to a base station and is not repeated here.

In another aspect, since the delay sensitivity of an IIoT service is strong, a radio resource is generally pre-configured based on the service mode to reduce transmission delay. The service performs data transmission on the pre-configured radio resource so that resource scheduling does not need to be performed in each transmission. Such resource pre-configuration manner is generally referred to as semi-persistent scheduling (SPS) in a downlink scenario and is generally referred to as configured grant (CG) in an uplink scenario. In the uplink and downlink scenarios, the operation of radio resource configuration is similar. For ease of description, an uplink resource pre-configuration and a downlink resource pre-configuration are each referred to as a semi-persistent resource configuration.

Embodiments of the present application provide a radio resource configuration method. Semi-persistent resource configurations with the same activation occasion or deactivation occasion may be taken as one semi-persistent resource configuration group so as to save the overload in resource activation or deactivation.

As for a semi-persistent resource configuration and a semi-persistent resource configuration group, the activation or deactivation coupling problem between the semi-persistent resource configuration group and the semi-persistent resource configuration needs to be considered. In one example, in a semi-persistent resource configuration group strategy, semi-persistent resource configurations that can be activated simultaneously need to be categorized into one group. For example, the table below shows the SPS configuration with 60 Hz as a frequency.

| Transmission Occasion No. | Desired Transmission Occasion (ms) | Desired Transmission Subframe |
|---|---|---|
| 0 | 0 | 0 |
| 1 | 16.66666667 | 17 |
| 2 | 33.33333333 | 34 |
| 3 | 50 | 50 |
| 4 | 66.66666667 | 67 |
| 5 | 83.33333333 | 84 |
| ... | | |

As for the service with 60 Hz as the frequency, the period=1 s/60=16.667 ms. Since the period is not an integral multiple of a subframe length of 10 ms, the service period cannot be configured directly in subframes. For example, in the data of the preceding table, resource intervals are 17 subframes, 17 subframes, 16 subframes, 17 subframes . . . . In this example, the service is divided into three SPS configurations with a period of 50 ms; that is, the service frequency of 60 Hz matches subframes in the configuration manner below. Multiple SPS configurations may be represented as follows:

```
{
SPS 1: SPSStartSubframe = 0; SPSInterval=50 subframe.
SPS 2: SPSStartSubframe = 17; SPSInterval=50 subframe.
SPS 3: SPSStartSubframe = 34; SPSInterval=50 subframe.
}
```

SPSStartSubframe denotes an SPS starting subframe. SPSInterval denotes an SPS transmission interval. Since corresponding to the same service period, the preceding three SPS configurations need to be activated or deactivated simultaneously.

FIG. 16 is a flowchart of a radio resource configuration method applied to a base station and configured for configuring a semi-persistent scheduling group according to embodiments of the present application. As shown in FIG. 16, the radio resource configuration method applied to a base station according to embodiments of the present application includes the following.

In S410, a mapping relationship between a semi-persistent resource configuration index and a semi-persistent resource group identity is configured for a UE.

In S420, an activation instruction or a deactivation instruction is sent to the UE, and a semi-persistent resource configuration is activated or deactivated for the semi-persistent resource group identity through the activation instruction or the deactivation instruction.

As mentioned above, in a semi-persistent resource configuration group strategy, semi-persistent resource configurations that can be activated simultaneously need to be categorized into one group. In S410, the mapping relationship between the semi-persistent resource configuration index and the semi-persistent resource group identity is established. In S420, downlink control information (DCI) can be used to send the information of the semi-persistent resource configuration index or the information of the semi-persistent resource group identity, and the activation instruction or the deactivation instruction is sent to the UE so that the semi-persistent resource configuration is activated or deactivated for the semi-persistent resource group identity. In one embodiment, the semi-persistent resource configuration index includes a semi-persistent scheduling (SPS) configuration index or a configured grant (CG) configuration index.

As mentioned above, in embodiments of the present application, an uplink resource pre-configuration and a downlink resource pre-configuration are each referred to as a semi-persistent resource configuration.

In one embodiment, the mapping relationship between the semi-persistent resource configuration index and the semi-persistent resource group identity includes a mapping relationship between one semi-persistent resource group identity and a plurality of semi-persistent resource configuration indexes. Each semi-persistent resource configuration corresponds to the value range of at least one process identity. The value range includes the at least one process identity. Alternatively, the value range includes the starting value of the process identity and the number of processes.

Figure 17:
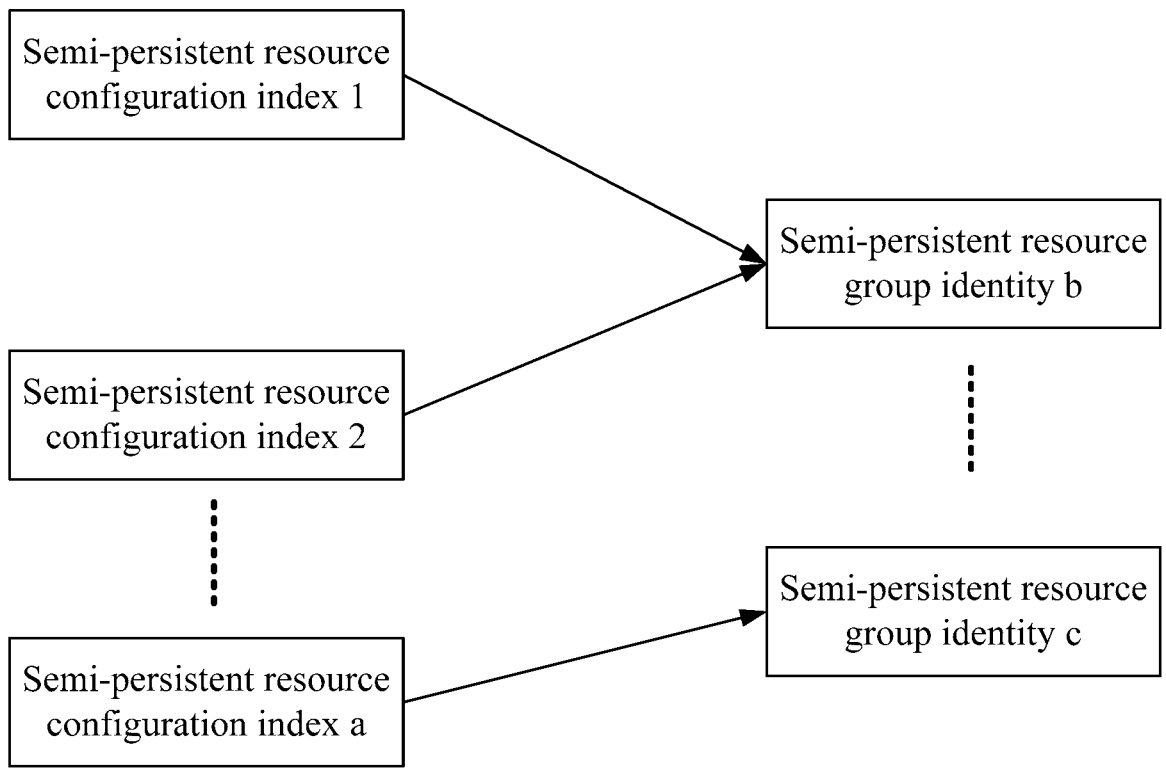
FIG. 17 is a diagram illustrating the configuration of a semi-persistent scheduling group in a radio resource configuration method according to embodiments of the present application.

FIG. 17 is a diagram illustrating the configuration of a semi-persistent scheduling group in a radio resource configuration method according to embodiments of the present application. As shown in FIG. 17, a semi-persistent resource group identity (SPS group identity) b corresponds to a semi-persistent resource configuration index (SPS Config index) 1 and a semi-persistent resource configuration index (SPS Config index) 2. That is, one semi-persistent resource group includes multiple semi-persistent resource configurations.

In one embodiment, the mapping relationship between the semi-persistent resource configuration index and the semi-persistent resource group identity includes a mapping relationship between one semi-persistent resource configuration index and a plurality of semi-persistent resource group identities. Each semi-persistent resource configuration corresponds to the value range of at least one process identity. The value range includes the at least one process identity. Alternatively, the value range includes the starting value of the process identity and the number of processes.

Figure 18:
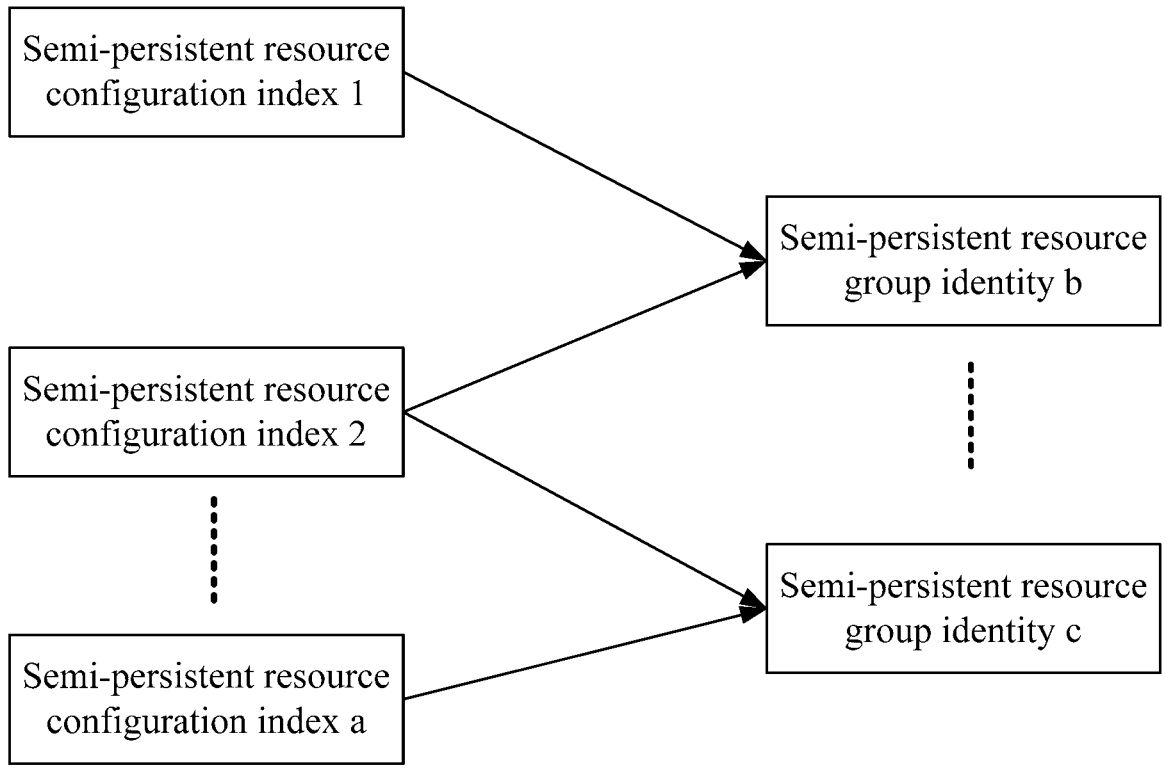
FIG. 18 is a diagram illustrating the configuration of a semi-persistent scheduling group in a radio resource configuration method according to embodiments of the present application.

FIG. 18 is a diagram illustrating the configuration of a semi-persistent scheduling group in a radio resource configuration method according to embodiments of the present application. As shown in FIG. 18, a semi-persistent resource configuration index (SPS Config index) 2 corresponds to a semi-persistent resource group identity (SPS group identity) b and a semi-persistent resource group identity (SPS group identity) c. That is, one semi-persistent resource configuration may belong to multiple different semi-persistent resource groups.

In one embodiment, that the mapping relationship between the semi-persistent resource configuration index and the semi-persistent resource group identity is configured for the UE includes the following.

The semi-persistent resource configuration index is mapped to the semi-persistent resource group identity through a MAC CE or RRC dedicated signaling.

In this embodiment, through the MAC CE or the RRC dedicated signaling, the base station maps the SPS configuration index to the SPS group identity or maps the CG configuration index to the CG group identity.

For the configuration of the mapping relationship between the semi-persistent resource configuration index and the semi-persistent resource group identity, refer to the detailed descriptions of the examples of FIGS. 17 and 18. Referring to FIG. 17, the base station maps the SPS configuration index to the SPS group identity through the MAC CE or the RRC dedicated signaling. In this example, the mapping may be a many-to-one mapping relationship; that is, multiple SPS configurations are mapped to one SPS group identity.

In one embodiment, the mapping through the RRC dedicated signaling may be that an SPS configuration includes an SPS group identity; that is, the SPS group to which the SPS configuration belongs is identified in the SPS configuration. In another embodiment, the mapping through the RRC dedicated signaling may be that an SPS group configuration carrying a group identity includes multiple SPS configurations and SPS indexes corresponding to the SPS configurations.

In one embodiment, that the activation instruction or the deactivation instruction is sent to the UE further includes that the downlink control information (DCI) is used to send the information of the semi-persistent resource configuration index or the information of the semi-persistent resource group identity and that the semi-persistent resource configuration is activated or deactivated for the semi-persistent resource configuration index or the semi-persistent resource group identity based on the activation instruction or the deactivation instruction.

The SPS activation or deactivation may be performed for an SPS group identity or performed separately for each SPS index. Similarly, the CG activation or deactivation may be performed for a CG group identity or performed separately for each CG index.

The base station maps the SPS configuration index to the SPS group identity through the MAC CE or the RRC dedicated signaling. For the indication manner of the mapping through the MAC CE, refer to FIGS. 19 and 20.

Figure 19:
FIG. 19 is a bitmap illustrating a SPS configuration of a radio resource configuration method according to embodiments of the present application.

One embodiment is shown in FIG. 19. 4 bits marked in the dark color in the figure represent an SPS group identity (SPS Group ID) bitmap. 12 bits marked in the light color in the figure represent an SPS configuration index bitmap. A bitmap is a way of representing a data structure by bits. The 4 bits marked in the dark color in FIG. 19 may represent 16 SPS group identities. On the 12 bits marked in the light color in FIG. 19, if the value of one bit is 1, it indicates that an SPS group identity represented by the 4 bits marked in the dark color includes the SPS configuration index corresponding to the bit; if the value of one bit is 0, it indicates that an SPS group identity represented by the 4 bits marked in the dark color does not include the SPS configuration index corresponding to the bit.

Figure 20:
FIG. 20 is a bitmap illustrating a SPS configuration of a radio resource configuration method according to embodiments of the present application.

Another embodiment is shown in FIG. 20. 4 bits marked in the dark color in the figure represent an SPS group identity (SPS Group ID) bitmap. 12 bits marked in the light color in the figure represent an SPS configuration index bitmap. In the 4 bits marked in the dark color in FIG. 20, each bit may represent one SPS group identity, and 4 bits represent 4 SPS group identities totally. For example, the first SPS group identity is represented by the value of the first bit being 1 and the value of each of the other three bits being 0; the second SPS group identity is represented by the value of the second bit being 1 and the value of each of the other three bits being 0. Similarly, on the 12 bits marked in the light color in FIG. 20, if the value of one bit is 1, it indicates that an SPS group identity represented by the 4 bits marked in the dark color includes the SPS configuration index corresponding to the bit; if the value of one bit is 0, it indicates that an SPS group identity represented by the 4 bits marked in the dark color does not include the SPS configuration index corresponding to the bit.

In one embodiment, that the downlink control information (DCI) is used to send the information of the semi-persistent resource configuration index or the information of the semi-persistent resource group identity includes the following.

The value range of the information of the semi-persistent resource configuration index and the value range of the information of the semi-persistent resource group identity are set separately, and the information of the semi-persistent resource configuration index and the information of the semi-persistent resource group identity are represented in the DCI by reusing.

Currently, in the activation or deactivation of the semi-persistent resource configuration, resource identities in the DCI can only have 4 bits at most which can represent 16 values. However, downlink semi-persistent resource configuration indexes require at least 8 values, and uplink semi-persistent resource configuration indexes require 16 values. Accordingly, in the current radio resource configuration strategy, there is no single bit to represent a semi-persistent resource configuration group. If the activation or deactivation of a semi-persistent resource and the activation or deactivation of a semi-persistent resource group are supported simultaneously, the reusing strategy of a resource group identity needs to be considered. In one embodiment, the method further includes that in the value range of semi-persistent resource configuration indexes and semi-persistent resource group identities that are carried by the DCI, each of A values in a first part in the value range is set to be the index value of a semi-persistent resource configuration index, and each of B values in a second part in the value range is set to be the index value of a semi-persistent resource group identity. A and B are positive integers. The first part and the second part do not overlap each other.

In one embodiment, in the predetermined value range of indexes of DCI resource configurations, each of the first A values is set to be the index value of a semi-persistent resource configuration index, and each of the last B values is set to be the index value of a semi-persistent resource group identity. A and B are positive integers. The sum of A and B is smaller than or equal to the number of the values in the predetermined value range.

The SPS configuration indexes and the SPS group identities need to be expressed simultaneously by 4 bits in the DCI, that is, a total of 16 values. Accordingly, the values of the 4 bits in the DCI need to be reused in one of the manners below.

In reusing manner one, the value range of the SPS configuration indexes and the value range of the SPS group identities may be different in configuration. For example, in example one, the value range of the SPS configuration indexes is 1 to 8, and the value range of the SPS group identities is 9 to 16 or 13 to 16; alternatively, in example two, the value range of the SPS configuration indexes is 1 to 12, and the value range of the SPS group identities is 13 to 16.

In the preceding example two, the predetermined value range of the indexes of the DCI resource configurations is 1 to 16. It is preset that A=12, and B=4. Each of the first A values of 1 to 12 is set to be the index value of a semi-persistent resource configuration index. Each of the last B values of 13 to 16 is set to be the index value of a semi-persistent resource group identity. A and B are positive integers. The sum of A and B is equal to the number of the values in the predetermined value range, that is, 16.

In one embodiment, the value index of a semi-persistent resource group identity is configured using one of the strategies below.

In strategy one, in the semi-persistent resource configuration information, the index value of the semi-persistent resource group identity is configured as the index value of a semi-persistent resource group identity in the DCI. Alternatively, in strategy two, in the semi-persistent resource configuration information, the index value of the semi-persistent resource group identity is configured as the difference between the index value of a semi-persistent resource group identity in the DCI and a predefined offset value.

Strategy one corresponds to the embodiment in the preceding reusing manner one. Strategy two corresponds to the embodiment in the reusing manner two hereinafter. In reusing manner two, the index value of a semi-persistent resource group identity in the DCI is preset by adding the index value of a semi-static resource group identity and the predefined offset value.

In reusing manner two, the value range of the SPS configuration indexes and the value range of the SPS group identities may be the same in configuration; however, the SPS group identities may add the predefined offset value so as to be mapped to the group identities in the DCI. For example, the value range of the SPS configuration indexes is 1 to 8, the value range of the SPS group identities is 1 to 8, and the predefined offset value "+8" is configured for the SPS group identities to represent the SPS group identities in the DCI. The configuration of the SPS group identities in this manner may also be referred to as an SPS group identity start offset.

When activation or deactivation is performed, the SPS activation or deactivation may be performed for an SPS group identity or performed separately for each SPS index.

The preceding strategies are also suitable for uplink (UL) SPS; that is, the preceding strategies are also suitable for the CG. For example, the base station maps the CG configuration index to the CG group identity through the MAC CE or the RRC dedicated signaling. In this example, the mapping may be a many-to-one mapping relationship; that is, one or more CG configurations are mapped to one CG group identity.

In one embodiment, the mapping through the RRC dedicated signaling may be that a CG configuration includes a CG group identity; that is, the CG group to which the CG configuration belongs is identified in the CG configuration. In another embodiment, the mapping through the RRC dedicated signaling may be that a CG group configuration carrying a group identity includes one or more CG configurations and one or more CG indexes corresponding to the one or more CG configurations. For the indication manner of the mapping through the MAC CE, refer to FIGS. 21 and 22.

Figure 21:
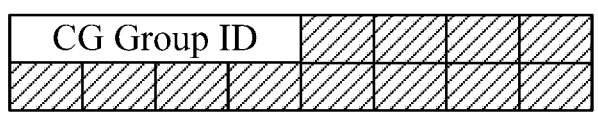
FIG. 21 is a bitmap illustrating a CG configuration of a radio resource configuration method according to embodiments of the present application.

One embodiment is shown in FIG. 21, 4 bits marked in the dark color in the figure represent a CG group identity (CG Group ID) bitmap, and 12 bits marked in the light color in the figure represent a CG configuration index bitmap. Similar to FIG. 19, the 4 bits marked in the dark color in FIG. 21 may represent 16 CG group identities. On the 12 bits marked in the light color in FIG. 21, whether the value of one bit to be set to 1 or 0 indicates whether a CG group identity represented by the 4 bits marked in the dark color includes the CG configuration index corresponding to the bit or not.

Figure 22:
FIG. 22 is a bitmap illustrating a CG configuration of a radio resource configuration method according to embodiments of the present application.

Another embodiment is shown in FIG. 22, 4 bits marked in the dark color in the figure represent a CG group identity (CG Group ID) bitmap, and 12 bits marked in the light color in the figure represent a CG configuration index bitmap. Similar to FIG. 20, in the 4 bits marked in the dark color in FIG. 22, each bit may represent one CG group identity, and 4 bits represent 4 CG group identities totally. For the detailed indication manner, refer to the description in FIG. 20, which is not repeated here.

The CG configuration indexes and the CG group identities need to be expressed simultaneously by 4 bits in the DCI, that is, a total of 16 values. Accordingly, the values of the 4 bits in the DCI need to be reused in one of the manners below.

In reusing manner three, the value range of the CG configuration indexes and the value range of the CG group identities may be different in configuration. For example, the value range of the CG configuration indexes is 1 to 12, and the value range of the CG group identities is 13 to 16.

In reusing manner four, the value range of the CG configuration indexes and the value range of the CG group identities may be the same in configuration; however, the CG group identities may add a predefined offset value so as to be mapped to the group identities in the DCI. For example, the value range of the CG configuration indexes is 1 to 12, the value range of the CG group identities is 1 to 4, and the predefined offset value "+4" is configured for the CG group identities to represent the CG group identities in the DCI. The configuration of the CG group identities in this manner may also be referred to as a CG group identity start offset.

When activation or deactivation is performed, the CG activation or deactivation may be performed for a CG group identity or performed separately for each CG index.

Referring to FIG. 18, the base station maps the SPS configuration index to the SPS group identity through the MAC CE or the RRC dedicated signaling. In this example, the mapping may be a one-to-many mapping relationship; that is, one SPS configuration is mapped to one or more SPS group identities.

In one embodiment, the mapping through the RRC dedicated signaling may be that an SPS configuration includes an SPS group identity indication of a bitmap type. Each bit corresponds to one SPS group identity. In another embodiment, the mapping through the RRC dedicated signaling may be that an SPS group configuration carrying the group identity includes multiple SPS configurations and SPS indexes corresponding to the SPS configurations.

For the indication manner of the mapping through the MAC CE, refer to FIGS. 19 and 20, which is not repeated here.

Similarly, the SPS configuration indexes and the SPS group identities need to be expressed simultaneously by 4 bits in the DCI, that is, a total of 16 values. Accordingly, the values of the 4 bits in the DCI need to be reused. For reusing, refer to the related description in the preceding reusing manner one and reusing manner two, which is not repeated here.

The preceding strategies are also suitable for UL SPS; that is, the preceding strategies are also suitable for the CG. For example, the base station maps the CG configuration index to the CG group identity through the MAC CE or the RRC dedicated signaling. The mapping may be one-to-many (that is, one CG configuration is mapped to one or more CG group identities).

In one embodiment, the mapping through the RRC dedicated signaling may be that a CG configuration includes a CG group identity indication of a bitmap type. Each bit corresponds to one CG group identity. In another embodiment, the mapping through the RRC dedicated signaling may be that a CG group configuration carrying the group identity includes multiple CG configurations and CG indexes corresponding to the CG configurations. For the indication manner of the mapping through the MAC CE, refer to FIGS. 21 and 22, which is not repeated here.

Similarly, the CG configuration indexes and the CG group identities need to be expressed simultaneously by 4 bits in the DCI, that is, a total of 16 values. Accordingly, the values of the 4 bits in the DCI need to be reused. For reusing, refer to the related description in the preceding reusing manner three and reusing manner four, which is not repeated here.

In one embodiment, the method further includes that one or more sets of semi-persistent resource configurations are configured for each semi-persistent resource configuration index. Each set of semi-persistent resource configurations corresponds to the value range of at least one process identity. The value range includes the at least one process identity. Alternatively, the value range includes the starting value of the process identity and the number of processes.

In this embodiment, one or more sets of semi-persistent resource configurations are configured for each semi-persistent resource configuration index. Each semi-persistent resource configuration index corresponds to an application scenario of one or more sets of semi-persistent resources. The one or more sets of semi-persistent resource configurations correspond to the application scenario of the one or more sets of semi-persistent resources respectively. Each set of semi-persistent resource configurations corresponds to the value range of at least one process identity.

Figure 23:
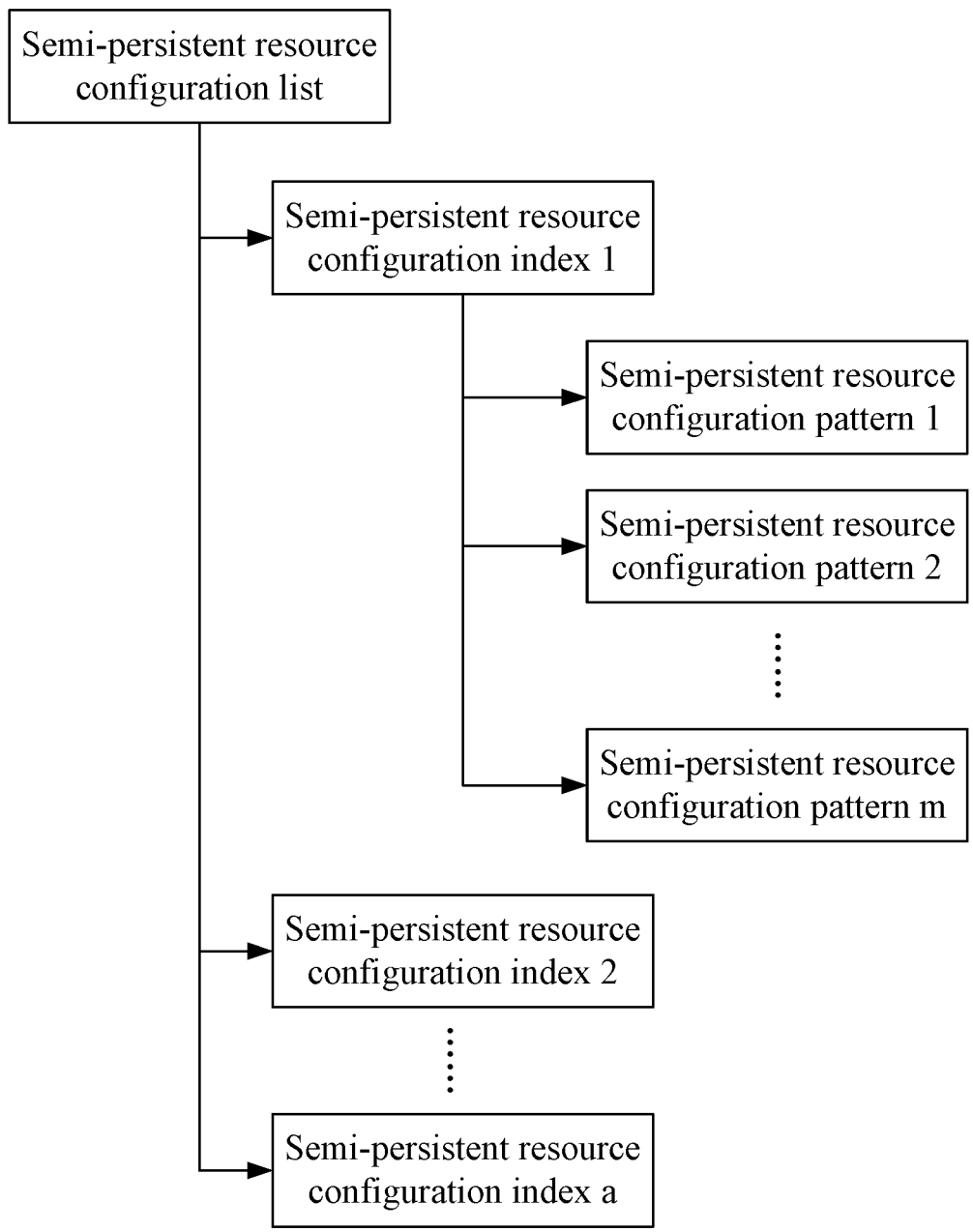
FIG. 23 is a diagram illustrating the configuration of a semi-persistent scheduling group in a radio resource configuration method according to embodiments of the present application.

FIG. 23 is a diagram illustrating the configuration of a semi-persistent scheduling group in a radio resource configuration method according to embodiments of the present application. As shown in FIG. 23, a semi-persistent resource configuration list (SPS Config List) includes multiple semi-persistent resource configuration indexes (SPS Config indexes). As shown in FIG. 23, the semi-persistent resource configuration list includes a semi-persistent resource configuration index 1, a semi-persistent resource configuration index 2, . . . , and a semi-persistent resource configuration index a. Taking the semi-persistent resource configuration index 1 as an example, multiple sets of semi-persistent resource configurations configured for the semi-persistent resource configuration index 1 include a semi-persistent resource configuration pattern (SPS Resource Pattern) 1, a semi-persistent resource configuration pattern 2, . . . , and a semi-persistent resource configuration pattern m.

In one embodiment, that one or more sets of semi-persistent resource configurations are configured for each semi-persistent resource configuration index includes that one or more sets of semi-persistent resource configurations are configured for each semi-persistent resource configuration index through the RRC dedicated signaling.

In one example, the base station configures multiple sets of SPS resources for one SPS configuration index through the RRC dedicated signaling. The SPS resources include at least one of the following contents: an SPS period or an SPS starting offset. In one example, one SPS configuration index is configured with multiple sets of SPS resources. The first set of SPS resources is configured with a starting time-domain position. For other sets of SPS resources except for the first set of SPS resources, the resource position for each set of SPS resources is configured as the SPS starting offset relative to the first set of SPS resources.

The SPS activation or deactivation is performed for an SPS configuration index. Each activation or deactivation is effective for SPS resources corresponding to the SPS configuration index. That is, each activation or deactivation is effective for one or more sets of SPS resource configurations corresponding to the SPS configuration index.

The preceding strategies are also suitable for UL SPS; that is, the preceding strategies are also suitable for the CG. In one example, the base station configures multiple sets of CG resources for one CG configuration index through the RRC dedicated signaling. The CG resources include at least one of the following contents: a CG period or a CG starting offset.

The CG activation or deactivation is performed for a CG configuration index. Each activation or deactivation is effective for CG resources corresponding to the CG configuration index. That is, each activation or deactivation is effective for one or more sets of CG resource configurations corresponding to the CG configuration index.

In one embodiment, the method further includes that the starting value of the process identity and the number of the processes are configured for each semi-persistent resource configuration or each set of semi-persistent resources in each semi-persistent resource configuration. In an application scenario corresponding to each semi-persistent resource configuration or each set of semi-persistent resources in each semi-persistent resource configuration, a process identity corresponding to a semi-persistent resource time-domain position is calculated based on the starting value of the process identity and the number of the processes. The application scenario of each set of the semi-persistent resources includes at least one of the following scenarios: Each set of semi-persistent resources is configured as SPS, and the period of each semi-persistent resource configuration is in slots, subframes, milliseconds, or Hertz; or each set of semi-persistent resources is configured as CG.

As for the scenario in which one semi-persistent resource configuration includes one or more sets of semi-persistent resources, each set of semi-persistent resource configurations has a corresponding process identity range. The at least one process identity (ID) of each set of resources needs to be calculated separately. In one embodiment, the process identity range includes at least one of the following contents: the starting value of the process identity and the number of the processes. In one embodiment, the process identity range includes at least the number of a process.

In one embodiment, that the process identity corresponding to the semi-persistent resource time-domain position is calculated based on the starting value of the process identity and the number of the processes includes that the process identity corresponding to the semi-persistent resource position is calculated based on the time-domain information of the current time-domain position of each set of semi-persistent resources, the number of slots in each radio frame, the number of slots in the current frame, the starting value of the process identity, the period of each semi-persistent resource configuration, and the number of the processes; or the process identity corresponding to the semi-persistent resource position is calculated based on the number of slots in each radio frame, the time-domain information of the starting time-domain position of each semi-persistent resource configuration, the resource position number, the starting value of the process identity, the period of each semi-persistent resource configuration, and the number of the processes.

In one embodiment, the current time-domain position is an NR time-domain position represented by at least one of the following manners: a system superframe number, a system frame number, a slot number, or a symbol number. The starting time-domain position of each semi-persistent resource configuration includes at least one of: the absolute time-domain position configured through dedicated signaling, the relative time-domain position that is offset by M time units relative to the DCI activation command receiving moment, or the time-domain position jointly determined based on the time-domain offset configured by the dedicated signaling and the offset of M time units relative to the DCI activation command receiving moment. M is a non-negative integer. One of the time units may be a radio frame, a subframe, a slot, or a symbol.

For example, the time-domain information of the starting time-domain position of each semi-persistent resource configuration is indicated through at least one of the following parameters: SFNstart time, slotstart time, or Symbolstart time. SFNstart time represents the starting radio frame number of resources in the semi-persistent resource configuration; slotstart time represents the starting slot number of resources in the semi-persistent resource configuration; and Symbolstart time represents the starting symbol number of resources in the semi-persistent resource configuration. The value of each preceding parameter may be determined in one of the following manners: the absolute time-domain position configured through dedicated signaling, the relative time-domain position that is offset by M time units relative to the DCI activation command receiving moment, or the time-domain position jointly determined based on the time-domain offset configured by the dedicated signaling and the offset of M time units relative to the DCI activation command receiving moment. M is a non-negative integer. One of the time units may be a radio frame, a subframe, a slot, or a symbol.

In an application scenario corresponding to each semi-persistent resource configuration or each set of semi-persistent resources in each semi-persistent resource configuration, a process identity corresponding to a semi-persistent resource time-domain position is calculated based on the starting value of the process identity and the number of the processes. Examples of calculating a process identity in different application scenarios are as below.

In calculation method example one, for downlink SPS, if the period of each semi-static resource configuration is in slots, Hybrid Automatic Repeat reQuest (HARQ) processes are taken as an example. The calculation formula of a process ID of each set of downlink SPS is as below.

HARQ Process ID=[floor(CURRENT_Slot/periodicity)]modulo nrofHARQ-Processes+harqProcessIdOffset.

HARQ Process ID represents the process ID of an HARQ; floor is a round-down operator; periodicity represents the period of the semi-static resource configuration; modulo is a modulo operator; nrofHARQ-Processe represents the number of HARQ processes; harqProcessIdOffsetharqProcessIdOffset represents the starting value of process identities; and CURRENT_slot (the current slot) is calculated using formula one or formula two below.

In formula one, CURRENT_slot=[(SFN×numberOfSlotsPerFrame)+slot number in the frame]. SFN represents the system frame number; numberOfSlotsPerFrame represents the number of slots in each radio frame; and slot number in the frame represents the number of slots in the current frame.

In formula two, CURRENT_slot=[(SFNstart time×numberOfSlotsPerFrame+slotstart time)+N×periodicity].

numberOfSlotsPerFrame represents the number of slots in each radio frame; SFNstart time and slotstart time represent the starting radio frame number of the SPS resources and the starting slot number of the SPS resources respectively; and periodicity represents the period of the semi-static resource configuration. N is a positive integer representing the resource location number, where N>=0.

One of the preceding formula one or formula two may be selected for calculating CURRENT_slot based on different application scenarios. Formula one is suitable for a scenario where a service period is an integer factor of 10240 ms (for example, one SFN period). Otherwise, the number of HARQ Process ID in different SFN periods may be different and the values of HARQ Process ID may be discontinuous across SFN periods so that the value of CURRENT_slot cannot be calculated using formula one. Formula two is suitable for a service period of any length.

In calculation method example two, for downlink SPS, if periodicity is in subframes or milliseconds (ms), HARQ processes are taken as an example. The calculation formula of a process ID of each set of downlink SPS is as below.

HARQ Process ID=[floor(CURRENT_Slot/periodicity)]modulo nrofHARQ-Processes+harqProcessIdOffset.

HARQ Process ID represents the process ID of an HARQ; floor is a round-down operator; numberOfSlotsPerSubFrame represents the number of slots in each subframe; periodicity represents the period of the semi-static resource configuration; modulo is a modulo operator; nrofHARQ-Processe represents the number of HARQ processes; harqProcessIdOffsetharqProcessIdOffset represents the starting value of process identities; and CURRENT_slot is calculated using formula one or formula two below.

In calculation method example three, for uplink SPS, HARQ processes are also taken as an example. The calculation formula of a process ID of each set of CG resources is as below.

HARQ Process ID=[floor(CURRENT_Slot/periodicity)]modulo nrofHARQ-Processes+harqProcessIdOffset.

HARQ Process ID represents the process ID of an HARQ; floor is a round-down operator; periodicity represents the period of the semi-static resource configuration; modulo is a modulo operator; nrofHARQ-Processe represents the number of HARQ processes; harqProcessIdOffsetharqProcessIdOffset represents the starting value of process identities; and CURRENT_slot (the current slot) is calculated using formula three below.

In formula three, CURRENT_symbol=[(SFNstart time×numberOfSlotsPerFrame*numberOfSymbolsPerSlot+slotstart time*numberOfSymbolsPerSlot+Symbolstart time)+N×periodicity].

numberOfSlotsPerFrame and numberOfSymbolsPerSlot represent the number of slots in each radio frame and the number of symbols in each slot respectively; SFNstart time, slotstart time, and Symbolstart time represent the starting radio frame number of the CG resources, the starting slot number of the CG resources, and the starting symbol number of the CG resources respectively; and periodicity represents the period of the semi-static resource configuration. N is a positive integer representing the resource location number, where N>=0.

In the preceding formulas, a process identity corresponding to a semi-persistent resource time-domain position is calculated based on the starting value of the process identity and the number of the processes. The base station sends radio resource configuration information, for example, the starting value of the process identity and the number of the processes, to the UE through the RRC dedicated signaling. The base station and the UE use the same formula and method mentioned above to calculate a process identity corresponding to a semi-persistent resource time-domain position so that the synchronization between the base station and the UE is achieved through the preceding radio resource configuration method.

Figure 24:
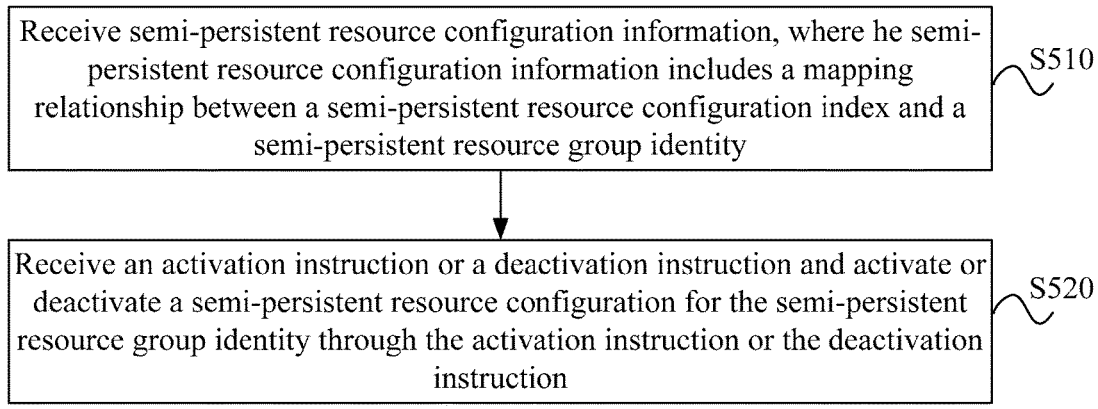
FIG. 24 is a flowchart illustrating the configuration of a semi-persistent scheduling group in a radio resource configuration method applied to a UE according to embodiments of the present application.

FIG. 24 is a flowchart illustrating the configuration of a semi-persistent scheduling group in a radio resource configuration method applied to a UE according to embodiments of the present application. As shown in FIG. 24, the radio resource configuration method applied to a UE according to embodiments of the present application includes the following.

In S510, semi-persistent resource configuration information is received. The semi-persistent resource configuration information includes a mapping relationship between a semi-persistent resource configuration index and a semi-persistent resource group identity.

In S520, an activation instruction or a deactivation instruction is received, and a semi-persistent resource configuration is activated or deactivated for the semi-persistent resource group identity through the activation instruction or the deactivation instruction.

As mentioned above, in a semi-persistent resource configuration group strategy, semi-persistent resource configurations that can be activated simultaneously need to be categorized into one group. In S510, the UE receives the mapping relationship between the semi-persistent resource configuration index and the semi-persistent resource group identity. In S520, The activation instruction or deactivation instruction received by the UE includes the information of the semi-persistent resource configuration index or the information of the semi-persistent resource group identity, and the semi-persistent resource configuration is activated or deactivated for the semi-persistent resource group identity based on the activation instruction or the deactivation instruction. Semi-persistent resource configurations with the same activation occasion or deactivation occasion may be taken as one semi-persistent resource configuration group so as to save the overload in resource activation or deactivation.

In one embodiment, the semi-persistent resource configuration index includes a semi-persistent scheduling (SPS) configuration index or a configured grant (CG) configuration index.

As mentioned above, in embodiments of the present application, an uplink resource pre-configuration and a downlink resource pre-configuration are each referred to as a semi-persistent resource configuration.

In one embodiment, the mapping relationship between the semi-persistent resource configuration index and the semi-persistent resource group identity includes a mapping relationship between one semi-persistent resource group identity and a plurality of semi-persistent resource configuration indexes. Each semi-persistent resource configuration corresponds to the value range of at least one process identity. The value range includes the at least one process identity. Alternatively, the value range includes the starting value of the process identity and the number of processes.

Referring to the embodiment shown in FIG. 17, one semi-persistent resource group includes multiple semi-persistent resource configurations.

In one embodiment, the mapping relationship between the semi-persistent resource configuration index and the semi-persistent resource group identity includes a mapping relationship between one semi-persistent resource configuration index and a plurality of semi-persistent resource group identities. Each semi-persistent resource configuration corresponds to the value range of at least one process identity. The value range includes the at least one process identity. Alternatively, the value range includes the starting value of the process identity and the number of processes.

Referring to the embodiment shown in FIG. 18, one semi-persistent resource configuration may belong to multiple different semi-persistent resource groups.

In one embodiment, that the semi-persistent resource configuration information is received includes the following.

The semi-persistent resource configuration information is received through a MAC CE or RRC dedicated signaling.

In this embodiment, through the MAC CE or the RRC dedicated signaling, the base station maps the SPS configuration index to the SPS group identity or maps the CG configuration index to the CG group identity. Accordingly, the UE receives the semi-persistent resource configuration information through the MAC CE or the RRC dedicated signaling.

In one embodiment, that the activation instruction or the deactivation instruction is received further includes the following.

The information of the semi-persistent resource configuration index or the information of the semi-persistent resource group identity is acquired, where the information of the semi-persistent resource configuration index or the information of the semi-persistent resource group identity is carried by DCI; and the semi-persistent resource configuration is activated or deactivated for the semi-persistent resource configuration index or the semi-persistent resource group identity based on the activation instruction or the deactivation instruction.

The SPS activation or deactivation may be performed for an SPS group identity or performed separately for each SPS index. Similarly, the CG activation or deactivation may be performed for a CG group identity or performed separately for each CG index. Semi-persistent resource configurations with the same activation occasion or deactivation occasion may be taken as one semi-persistent resource configuration group so as to save the overload in resource activation or deactivation.

The next-generation Node B maps the SPS configuration index to the SPS group identity through the MAC CE or the RRC dedicated signaling. For the indication manner of the mapping through the MAC CE, refer to FIGS. 19 and 20.

In one embodiment, the information of the semi-persistent resource configuration index or the information of the semi-persistent resource group identity includes the information of the semi-persistent resource configuration index or the information of the semi-persistent resource group identity represented in the DCI by reusing based on the preset value range of the information of the semi-persistent resource configuration index and the preset value range of the information of the semi-persistent resource group identity.

Currently, in the activation or deactivation of the semi-persistent resource configuration, resource identities in the DCI can only have 4 bits at most which can represent 16 values. However, downlink semi-persistent resource configuration indexes require at least 8 values, and uplink semi-persistent resource configuration indexes require 16 values. If the activation or deactivation of a semi-persistent resource and the activation or deactivation of a semi-persistent resource group are supported simultaneously, the reusing strategy of a resource group identity needs to be considered.

In one embodiment, the method further includes that in the value range of semi-persistent resource configuration indexes and semi-persistent resource group identities that are carried by the DCI, A bit values in a first part in the value range are acquired, that each of the A bit values is set to be the index value of a semi-persistent resource configuration index, that B bit values in a second part in the value range are acquired, and each of the B bit values is set to be the index value of a semi-persistent resource group identity. A and B are positive integers. The first part and the second part do not overlap each other.

In one embodiment, in the predetermined value range of indexes of DCI resource configurations, each of the first A values is set to be the index value of a semi-persistent resource configuration index, and each of the last B values is set to be the index value of a semi-persistent resource group identity. A and B are positive integers. The sum of A and B is smaller than or equal to the number of the values in the predetermined value range.

For example, the predetermined value range of the indexes of the DCI resource configurations is 1 to 16. It is predetermined that A=12, and B=4. Each of the first A values of 1 to 12 is set to be the index value of a semi-persistent resource configuration index. Each of the last B values of 13 to 16 is set to be the index value of a semi-persistent resource group identity. A and B are positive integers. The sum of A and B is equal to the number of the values in the predetermined value range, that is, 16. For the detailed indication manner, refer to the related description on the method applied to a base station and configured for configuring a semi-persistent scheduling group according to embodiments of the present application, which is not repeated here.

In one embodiment, the value index of a semi-persistent resource group identity is configured using one of the strategies below.

In the semi-persistent resource configuration information, the index value of a semi-persistent resource group identity in the DCI is taken as the index value of the semi-persistent resource group identity. Alternatively, in the semi-persistent resource configuration information, the difference between the index value of a semi-persistent resource group identity in the DCI and a predefined offset value is taken as the index value of the semi-persistent resource group identity. For example, the value range of the SPS configuration indexes and the value range of the SPS group identities may be the same in configuration; however, the SPS group identities may add the predefined offset value so as to be mapped to the group identities in the DCI. For example, the value range of the SPS configuration indexes is 1 to 8, the value range of the SPS group identities is 1 to 8, and the predefined offset value "+8" is configured for the SPS group identities to represent the SPS group identities in the DCI.

After receiving the indication manner mapped through the MAC CE, the UE can analyze the index value of a semi-persistent resource configuration index and the index value of a semi-persistent resource group identity based on the preset value range of the information of the semi-persistent resource configuration index and the preset value range of the information of the semi-persistent resource group identity. Further, activation or deactivation is performed based on the analyzed radio resource configuration information.

The preceding strategies are also suitable for uplink (UL) SPS; that is, the preceding strategies are also suitable for the CG. For example, the base station maps the CG configuration index to the CG group identity through the MAC CE or the RRC dedicated signaling. For the indication manner of the mapping through the MAC CE, refer to FIGS. 21 and 22. For the related method for a CG configured applied to a UE, refer to the description on the method applied to a base station and configured for configuring a semi-persistent scheduling group according to embodiments of the present application, which is not repeated here. In one embodiment, the semi-persistent resource configuration information further includes that each semi-persistent resource configuration index corresponds to one or more sets of semi-persistent resources. Each set of semi-persistent resource configurations corresponds to the value range of at least one process identity. The value range includes the at least one process identity. Alternatively, the value range includes the starting value of the process identity and the number of processes.

As shown in FIG. 23, a semi-persistent resource configuration list (SPS Config List) includes multiple semi-persistent resource configuration indexes (SPS Config indexes). Taking the semi-persistent resource configuration index 1 as an example, multiple sets of semi-persistent resource configurations configured for the semi-persistent resource configuration index 1 include a semi-persistent resource configuration pattern (SPS Resource Pattern) 1, a semi-persistent resource configuration pattern 2, . . . , and a semi-persistent resource configuration pattern m.

In one embodiment, the method further includes the following.

The RRC dedicated signaling is received. The RRC dedicated signaling carries one or more sets of semi-persistent resource configurations corresponding to each semi-persistent resource configuration index.

In one embodiment, in the RRC dedicated signaling received by the UE, multiple sets of SPS resources are configured for one SPS configuration index. The SPS resources include at least one of the following contents: an SPS period or an SPS starting offset. The SPS activation or deactivation is performed for an SPS configuration index. Each activation or deactivation is effective for SPS resources corresponding to the SPS configuration index. The preceding strategies are also suitable for UL SPS; that is, the preceding strategies are also suitable for the CG.

In one embodiment, each semi-persistent resource configuration index corresponds to an application scenario of one or more sets of semi-persistent resources. Each set of semi-persistent resource configurations corresponds to the value range of at least one process identity. Based on a specific application scenario, the UE may use a corresponding semi-persistent resource configuration to calculate a process identity corresponding to a semi-persistent resource time-domain position.

In one embodiment, the method further includes the following.

In an application scenario corresponding to each semi-persistent resource configuration or each set of semi-persistent resources in each semi-persistent resource configuration, a process identity corresponding to a semi-persistent resource time-domain position is calculated based on the starting value of the process identity and the number of the processes. The application scenario of each set of the semi-persistent resources includes at least one of the following scenarios: Each set of semi-persistent resources is configured as SPS, and the period of each semi-persistent resource configuration is in slots, subframes, milliseconds, or Hertz; or each set of semi-persistent resources is configured as CG.

As for the scenario in which one semi-persistent resource configuration includes one or more sets of semi-persistent resources, each set of semi-persistent resource configurations has a corresponding process identity range. The at least one process identity (ID) of each set of resources needs to be calculated separately. In one embodiment, the process identity range includes at least one of the following contents: the starting value of the process identity and the number of the processes. In one embodiment, the process identity range includes at least the number of a process.

In one embodiment, that the process identity corresponding to the semi-persistent resource time-domain position is calculated based on the starting value of the process identity and the number of the processes includes that the process identity corresponding to the semi-persistent resource position is calculated based on the time-domain information of the current time-domain position of each set of semi-persistent resources, the number of slots in each radio frame, the number of slots in the current frame, the starting value of the process identity, the period of each semi-persistent resource configuration, and the number of the processes; or the process identity corresponding to the semi-persistent resource position is calculated based on the number of slots in each radio frame, the time-domain information of the starting time-domain position of each semi-persistent resource configuration, the resource position number, the starting value of the process identity, the period of each semi-persistent resource configuration, and the number of the processes.

In one embodiment, the current time-domain position is an NR time-domain position represented by at least one of the following manners: a system superframe number, a system frame number, a slot number, or a symbol number. The starting time-domain position of each semi-persistent resource configuration includes at least one of: the absolute time-domain position configured through dedicated signaling, the relative time-domain position that is offset by M time units relative to the DCI activation command receiving moment, or the time-domain position jointly determined based on the time-domain offset configured by the dedicated signaling and the offset of M time units relative to the DCI activation command receiving moment. M is a non-negative integer. One of the time units may be a radio frame, a subframe, a slot, or a symbol.

In an application scenario corresponding to each semi-persistent resource configuration or each set of semi-persistent resources in each semi-persistent resource configuration, a process identity corresponding to a semi-persistent resource time-domain position is calculated based on the starting value of the process identity and the number of the processes. Corresponding formulas may be configured for calculating a process identity in different application scenarios. For a calculation method, refer to calculation method example one, calculation method example two, and calculation method example three described in the method applied to a base station and configured for configuring a semi-persistent scheduling group according to embodiments of the present application, which is not repeated here.

In the preceding calculation examples, a process identity corresponding to a semi-persistent resource time-domain position is calculated based on the starting value of the process identity and the number of the processes. The base station sends radio resource configuration information, for example, the starting value of the process identity and the number of the processes, to the UE through the RRC dedicated signaling. The base station and the UE use the same formula and method mentioned above to calculate a process identity corresponding to a semi-persistent resource time-domain position so that the synchronization between the base station and the UE is achieved through the preceding radio resource configuration method.

For the preceding radio resource configuration method applied to a UE and configured for configuring a semi-persistent scheduling group, refer to the description in the radio resource configuration method applied to a base station and configured for configuring a semi-persistent scheduling group according to embodiments of the present application, which is not repeated here. In another aspect, the transmission delay sensitivity of an IIoT service is considered. For example, the transmission delay sensitivity is generally smaller than 0.5 ms. However, currently in an NR radio access network system, the minimum duration of a radio measurement gap (or measurement period) is 1.5 ms. Moreover, in the measurement gap period, the UE cannot send or receive a service in a connection mode. Accordingly, the transmission delay requirement of the IIoT service cannot be satisfied by using a current measurement gap. In this regard, embodiments of the present application provide a radio resource configuration method which solves the preceding problem through the short measurement gap configuration of a TSC service.

Figure 25:
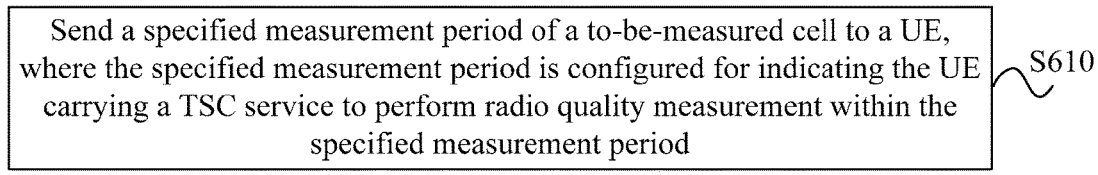
FIG. 25 is a flowchart illustrating the short measurement gap configuration of a TSC service in a radio resource configuration method applied to a base station according to embodiments of the present application.

FIG. 25 is a flowchart illustrating the short measurement gap configuration of a TSC service in a radio resource configuration method applied to a base station according to embodiments of the present application. As shown in FIG. 25, the radio resource configuration method includes the following.

In S610, a specified measurement period of a to-be-measured cell is sent to a UE. The specified measurement period is configured for indicating the UE carrying a TSC service to perform a radio quality measurement within the specified measurement period. The specified measurement period includes a measurement signal sending occasion sequence and a measurement time window.

Referring to FIG. 25, the base station notifies the UE of the measurement signal sending occasion sequence of the to-be-measured cell or the measurement time window of the to-be-measured cell.

The UE carrying the TSC service performs radio quality measurement only in a measurement signal receiving occasion or the measurement time window.

A measurement gap is a small gap created. In this interval, the base station does not perform dedicated resource scheduling for the UE; that is, the UE does not send or receive a dedicated service but only performs radio quality measurement. Considering a time-sensitive communication service, for example, considering the transmission delay sensitivity of an IIoT service, the transmission delay requirement of the IIoT service cannot be satisfied by using a current measurement gap. According to embodiments of the present application, a specified measurement period of a to-be-measured cell is configured so as to satisfy the transmission delay requirement of the time-sensitive communication service.

In one embodiment, that the specified measurement period of the to-be-measured cell is sent to the UE includes the following.

The specified measurement period of the to-be-measured cell is sent to the UE through dedicated signaling or a broadcast mechanism.

In this embodiment, the base station notifies the UE of the measurement signal sending occasion sequence of the to-be-measured cell or the measurement time window of the to-be-measured cell through the dedicated signaling or the broadcast mechanism.

In one embodiment, the measurement time window includes at least one of the following: the measurement interval information, the length of a measurement gap, or the measurement starting offset information.

The measurement interval information refers to the interval of measurement gaps or the repetition period of measurement gaps. The measurement interval information includes that one measurement gap is configured at an interval of L time units. A time unit of the L time units includes any one of a measurement signal interval, a symbol, a slot, a subframe, a radio frame, a millisecond, or a second. L is a positive integer. The length of a measurement gap includes K time units. A time unit of the K time units includes any one of a measurement signal interval, a symbol, a slot, or a subframe. K is a positive integer. The measurement starting offset information includes the configuration information configured for determining a measurement starting occasion.

The time window includes at least one of the following: the measurement interval information, the length of a measurement gap, or the configuration information configured for determining a measurement starting occasion, for example, measurement starting offset information.

Figure 26:
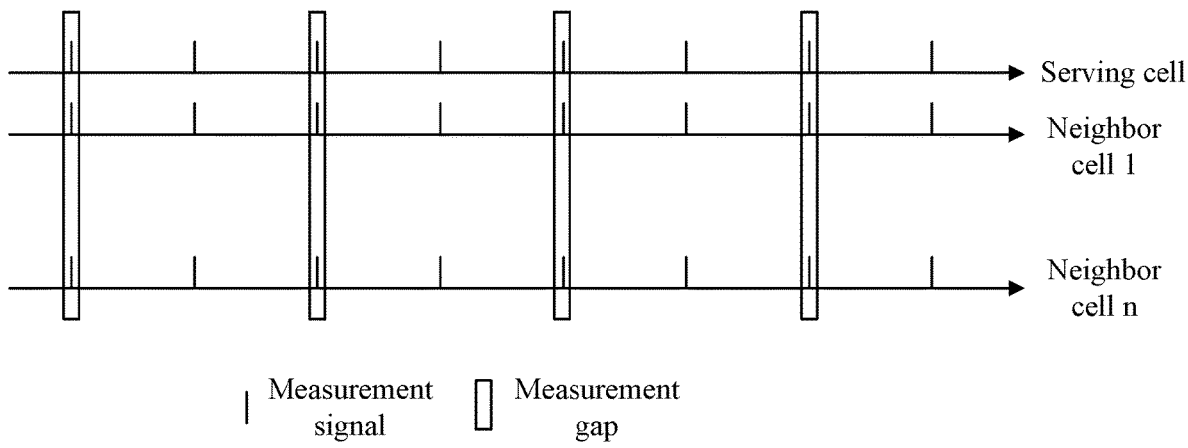
FIG. 26 is a diagram illustrating the short measurement gap configuration of a TSC service in a radio resource configuration method according to embodiments of the present application.

FIG. 26 is a diagram illustrating the short measurement gap configuration of a TSC service in a radio resource configuration method according to embodiments of the present application. As shown in FIG. 26, the measurement interval information refers to the interval of measurement gaps or the repetition period of measurement gaps. An interval of sending measurement signals, for example, an interval of sending L measurement signals, may be taken as a unit. L is a positive integer. For example, in FIG. 26, one measurement gap is set for every two measurement signals. That is, one measurement gap is set for every other measurement signal. The measurement time window may be an SS/PBCH block measurement time configuration (SMTC) window or a similar configuration. An SS block is short for a synchronization signal block. PBCH is short for a physical broadcast channel.

Based on the preceding notification and measurement behavior of the specified measurement period, the length of a measurement gap can be configured to be relatively short. For example, the measurement is performed only on a measurement signal receiving occasion. Moreover, the measurement gap may be configured based on the interval of measurement signals. For example, in one embodiment, one measurement gap occurs at an interval of L measurement signals. The length of a measurement gap is based on a UE implementation or a predefined length. For example, the length of a measurement gap is a duration of a+b+c, where a denotes the duration of the measurement gap before a measurement signal is sent, b denotes the sending duration of the measurement signal, and c denotes the duration of the measurement gap after the measurement signal is sent completely. a, b, c, and L may be positive integers. In another embodiment, the configuration may be performed based on an NR time unit. For example, the NR time unit may be the number of symbols, the number of slots, the number of subframes, and the number of radio frames. The starting position of a measurement gap may be determined based on a parameter configuration or be predefined by standards. The specific parameter configuration may include, for example, starting from some offsets after the measurement gap configuration is received or starting from a predefined SFN.

In one embodiment, the measurement signal sending occasion sequence includes at least one of the following: the sending time-domain position of a measurement signal, a sending interval, or the sending duration of a measurement signal.

In FIG. 26, the measurement signal sending occasion sequence is indicated by small vertical lines. The UE may select one occasion from the measurement signal sending occasion sequence to perform a radio quality measurement.

The measurement signal includes a downlink signal configured for measuring the reference signal received power (RSRP) of the cell and includes at least one of the following: a reference signal (RS), a narrowband reference signal (NBS), a channel state information reference signal (CSI-RS), or an SS reference signal.

In one example, if measurement information, for example, the measurement information including the specified measurement period, is sent, through the dedicated signaling, the UE needs to report a UE-related capability. The base station can configure related measurement information only to the UE that supports the UE-related capability. The UE-related capability may be one of the following information: an indication of the short measurement gap support capability, an indication of a TSC service support capability, or an indication of the receiving capability of the measurement signal sending occasion sequence.

In one embodiment, the to-be-measured cell includes a to-be-measured target cell and/or a to-be-measured neighbor cell set. The to-be-measured cell is configured for carrying the TSC service.

Moreover, clock information satisfies synchronization at a nanosecond (ns) level.

As shown in FIG. 26, the to-be-measured cell includes a serving cell and several neighbor cells supporting the TSC service. The information of the to-be-measured cell may be explicitly indicated by the base station.

Figure 27:
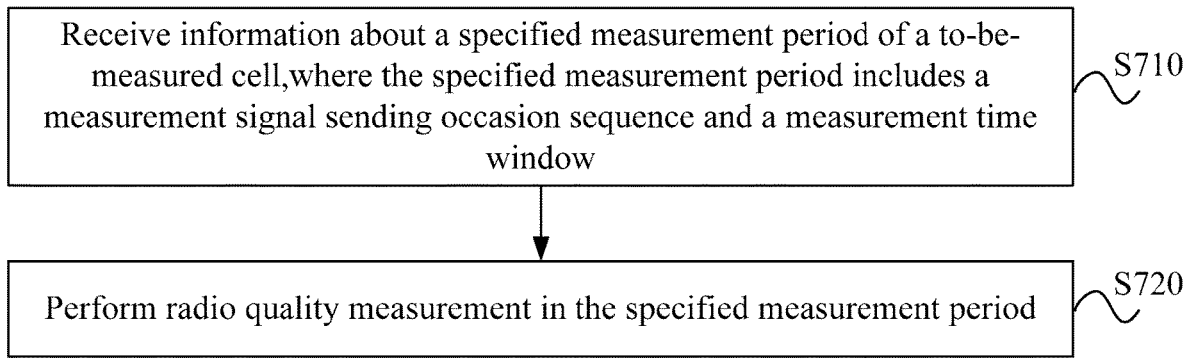
FIG. 27 is a flowchart illustrating the short measurement gap configuration of a TSC service in a radio resource configuration method applied to a UE according to embodiments of the present application.

FIG. 27 is a flowchart illustrating the short measurement gap configuration of a TSC service in a radio resource configuration method applied to a UE according to embodiments of the present application. As shown in FIG. 27, the radio resource configuration method includes the following.

In S710, the information about a specified measurement period of a to-be-measured cell is received. The specified measurement period includes a measurement signal sending occasion sequence and a measurement time window.

In S720, radio quality measurement is performed in the specified measurement period.

Referring to FIG. 26, the base station notifies the UE of the measurement signal sending occasion sequence of the to-be-measured cell or the measurement time window of the to-be-measured cell.

The UE carrying the TSC service performs radio quality measurement only in a measurement signal receiving occasion or the measurement time window. According to embodiments of the present application, a specified measurement period of a to-be-measured cell is configured so as to satisfy the transmission delay requirement of the time-sensitive communication service (for example, an IIoT service).

In one embodiment, that the information of the specified measurement period of the to-be-measured cell is received includes the following.

The specified measurement period of the to-be-measured cell is received through dedicated signaling or a broadcast mechanism.

In this embodiment, the base station notifies the UE of the measurement signal sending occasion sequence of the to-be-measured cell or the measurement time window of the to-be-measured cell through the dedicated signaling or the broadcast mechanism. Accordingly, the UE receives the information of the specified measurement period of the to-be-measured cell through the dedicated signaling or the broadcast mechanism.

In one embodiment, the measurement time window includes at least one of the measurement interval information, the length of a measurement gap, or the measurement starting offset information. The measurement interval information refers to the interval of measurement gaps or the repetition period of measurement gaps. The measurement interval information includes that one measurement gap is configured at an interval of L time units. A time unit of the L time units includes any one of a measurement signal interval, a symbol, a slot, a subframe, a radio frame, a millisecond, or a second. L is a positive integer. The length of a measurement gap includes K time units. A time unit of the K time units includes any one of a measurement signal interval, a symbol, a slot, or a subframe. K is a positive integer.

The measurement starting offset information includes the configuration information configured for determining a measurement starting occasion.

The time window includes at least one of the following: the measurement interval information, the length of a measurement gap, or the configuration information configured for determining a measurement starting occasion, for example, measurement starting offset information.

As shown in FIG. 26, the measurement interval information refers to the interval of measurement gaps or the repetition period of measurement gaps. An interval of sending measurement signals, for example, an interval of sending L measurement signals, may be taken as a unit. L is a positive integer. The measurement time window may be an SMTC window or a similar configuration.

For the UE based on the preceding notification and measurement behavior of the specified measurement period, the length of a measurement gap can be configured to be relatively short. For example, the measurement is performed only on a measurement signal receiving occasion. Moreover, the measurement gap may be configured based on the interval of measurement signals. For example, in one embodiment, one measurement gap occurs at an interval of L measurement signals. The length of a measurement gap is based on a UE implementation or a predefined length. For example, the length of a measurement gap is a duration of a+b+c, where a denotes the duration of the measurement gap before a measurement signal is sent, b denotes the sending duration of the measurement signal, and c denotes the duration of the measurement gap after the measurement signal is sent completely. a, b, c, and L may be positive integers. In another embodiment, the configuration may be performed based on an NR time unit. For example, the NR time unit may be the number of symbols, the number of slots, the number of subframes, and the number of radio frames. The starting position of a measurement gap may be determined based on a parameter configuration or be predefined by standards. The specific parameter configuration may include, for example, starting from some offsets after the measurement gap configuration is received or starting from a predefined SFN.

In one embodiment, the measurement signal sending occasion sequence includes at least one of the following: the sending time-domain position of a measurement signal, a sending interval, or the sending duration of a measurement signal.

In FIG. 26, the measurement signal sending occasion sequence is indicated by small vertical lines.

The UE may select one occasion from the measurement signal sending occasion sequence to perform a radio quality measurement.

The measurement signal includes a downlink signal configured for measuring the reference signal received power (RSRP) of the cell and includes at least one of the following: a reference signal (RS), a narrowband reference signal (NBS), a channel state information reference signal (CSI-RS), or an SS reference signal.

In one example, if measurement information, for example, the measurement information including the specified measurement period, is sent, through the dedicated signaling, the UE needs to report a UE-related capability. The base station can configure related measurement information only to the UE that supports the UE-related capability. The UE-related capability may be one of the following information: an indication of the short measurement gap support capability, an indication of a TSC service support capability, or an indication of the receiving capability of the measurement signal sending occasion sequence.

In one embodiment, the to-be-measured cell includes a to-be-measured target cell and/or a to-be-measured neighbor cell set. The to-be-measured cell is configured for carrying the TSC service. Moreover, clock information satisfies synchronization at an ns level.

As shown in FIG. 26, the to-be-measured cell includes a serving cell and several neighbor cells supporting the TSC service. The information of the to-be-measured cell may be explicitly indicated by the base station.

For the preceding radio resource configuration method applied to a UE and configured for the short measurement gap configuration of a TSC service, refer to the description in the radio resource configuration method applied to a base station and configured for the short measurement gap configuration of a TSC service according to embodiments of the present application, which is not repeated here.

Figure 28:
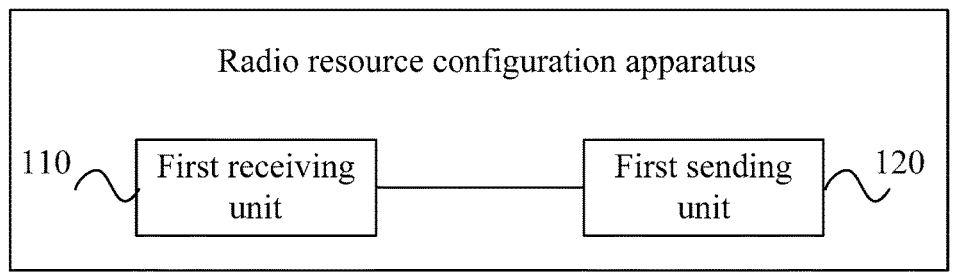
FIG. 28 is a block diagram illustrating the structure of a radio resource configuration apparatus applied to a base station according to embodiments of the present application.

FIG. 28 is a block diagram illustrating the structure of a radio resource configuration apparatus applied to a base station according to embodiments of the present application. As shown in FIG. 28, the radio resource configuration apparatus applied to a base station according to embodiments of the present application includes a first receiving unit 110 and a first sending unit 120. The first receiving unit 110 is configured to receive TSC service indication information. The TSC service indication information includes a TSC clock accuracy indication or an indication of whether to be a TSC service. The first sending unit 120 is configured to send clock information.

In one embodiment, the clock information includes a specified system frame number (SFN) and the time of a specified SFN endpoint boundary generated based on the TSC service indication information.

In one embodiment, the first receiving unit 110 includes a first receiving sub-unit, a second receiving sub-unit, and a third receiving sub-unit. The first receiving sub-unit is configured to receive the TSC service indication information sent by a user equipment (UE). The second receiving sub-unit is configured to receive the TSC service indication information sent by an Access and Mobility Management Function (AMF) module. The third receiving sub-unit is configured to receive the TSC service indication information sent by a second base station through dedicated signaling.

In one embodiment, the first receiving sub-unit is configured to, in one of the following manners: receive the TSC service indication information sent by the UE and carried by a radio link control (RLC) state package, receive the TSC service indication information sent by the UE and carried by a medium access control control element (MAC-CE), receive the TSC service indication information sent by the UE and carried by a medium access control (MAC) preamble, receive the TSC service indication information sent by the UE and carried by a Packet Data Convergence Protocol (PDCP) state package, or receive the TSC service indication information sent by the UE and carried by a radio resource control (RRC) message.

In one embodiment, the second receiving sub-unit is configured to, in one of the following manners: receive the TSC service indication information carried by the common signaling of an NG interface or receive the TSC service indication information carried by the dedicated signaling of the NG interface.

In one embodiment, the first sending unit 120 is configured to send the clock information to the UE after receiving the TSC service indication information sent by the UE or, in the case where cell handover is not needed, send the clock information to the UE after receiving the TSC service indication information sent by the AMF.

In one embodiment, the first sending unit 120 is configured to send the TSC service indication information to a target base station of the handover and trigger the target base station to broadcast the clock information after receiving the TSC service indication information sent by the AMF in the cell handover process.

In one embodiment, the first sending unit 120 is configured to send the dedicated signaling carrying the TSC service indication information or the dedicated signaling carrying a clock information request to the target base station of the handover after receiving the TSC service indication information sent by the AMF in the cell handover process.

In one embodiment, the TSC service indication information carried by the dedicated signaling is configured for acquiring the clock information of the target base station and sending the clock information to the UE or indicating the target base station of the handover to send the clock information through broadcasting.

In one embodiment, the first sending unit 120 is configured to send the clock information to the source base station of the handover after receiving the TSC service indication information sent by the source base station of the handover or the clock information request sent by the source base station of the handover in the cell handover process.

In one embodiment, in the case where the centralized unit of the next-generation NodeB (gNB-CU) and the distributed unit of the next-generation NodeB (gNB-DU) are split, the first receiving sub-unit is configured to perform receiving in one of the following manners: The gNB-DU receives the TSC service indication information carried by the radio link control (RLC) state package, the TSC service indication information carried by the medium access control control element (MAC-CE), and the TSC service indication information carried by the MAC preamble that are sent by the UE; or the gNB-CU receives the TSC service indication information carried by the Packet Data Convergence Protocol (PDCP) state package, the TSC service indication information carried by the MAC preamble, and the TSC service indication information carried by the radio resource control (RRC) message that are sent by the UE and forwarded by the gNB-DU. In one embodiment, the first receiving unit 110 is configured such that the gNB-DU receives the TSC service indication information sent by the UE or such that the gNB-CU receives the TSC service indication information sent by the AMF and forwards the TSC service indication information to the gNB-DU. Sending the clock information to the UE includes that gNB-DU sends the clock information generated by the gNB-DU to the UE.

In one embodiment, the first receiving unit 110 is configured such that the gNB-DU receives the TSC service indication information sent by the UE and forwards the TSC service indication information to the gNB-CU or such that the gNB-CU receives the TSC service indication information sent by the AMF. The first sending unit 120 is configured such that the gNB-CU generates the dedicated signaling and sends the dedicated signaling to the gNB-DU and such that the gNB-DU sends the dedicated signaling to the UE.

In one embodiment, the dedicated signaling carries the clock information generated by the gNB-CU.

In one embodiment, the apparatus further includes a first interaction unit. The first interaction unit is configured such that when forwarding the TSC service indication information to the gNB-CU, the gNB-DU sends the clock information generated by the gNB-DU to the gNB-CU. The dedicated signaling carries the clock information generated by the gNB-DU.

In one embodiment, the apparatus further includes a second interaction unit and a third interaction unit. The second interaction unit is configured such that after receiving the TSC service indication information sent by the AMF, the gNB-CU forwards the TSC service indication information to the gNB-DU or sends the clock information request to the gNB-DU. The third interaction unit is configured such that after receiving the TSC service indication information or the clock information request, the gNB-DU sends the clock information generated by the gNB-DU to the gNB-CU. The dedicated signaling carries the clock information generated by the gNB-DU.

In one embodiment, the third interaction unit is configured such that the gNB-DU periodically generates the clock information and periodically sends the generated clock information to the gNB-CU or such that the gNB-DU generates the clock information and sends the generated clock information to the gNB-CU.

In one embodiment, the apparatus further includes a fourth interaction unit. The fourth interaction unit is configured such that before the clock information is sent to the UE, it further includes that the gNB-CU sends the clock information carried by a system information block 9 (SIB9) and sends a periodic clock information broadcast indication to the gNB-DU through the dedicated signaling.

In one embodiment, the first sending unit 120 is configured such that after receiving the periodic clock information broadcast indication, the gNB-DU reconstructs the SIB9-carried clock information generated by the gNB-CU, writes the SIB9-carried clock information as the time of the specified SFN endpoint boundary based on the acquisition of its own clock information, and sends the SIB9 to the UE through broadcasting.

In one embodiment, the first sending unit 120 is configured such that the gNB-DU sends the periodic clock information broadcast indication of the SIB9 carrying the clock information to the UE through the dedicated signaling.

In one embodiment, the first sending unit 120 is configured to send the clock information in any one of the following manners: the radio link control (RLC) state package, the medium access control control element (MAC-CE), downlink control information (DCI), the Packet Data Convergence Protocol (PDCP) state package, the radio resource control (RRC) message, or a broadcast message.

Figure 29:
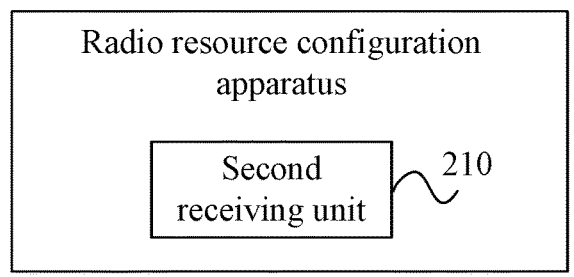
FIG. 29 is a block diagram illustrating the structure of a radio resource configuration apparatus applied to a UE according to embodiments of the present application.

FIG. 29 is a block diagram illustrating the structure of a radio resource configuration apparatus applied to a UE according to embodiments of the present application. As shown in FIG. 29, the radio resource configuration apparatus applied to a UE according to embodiments of the present application includes a second receiving unit 210 configured to receive the clock information sent by a base station.

In one embodiment, the apparatus further includes a fifth sending unit. The fifth sending unit is configured to send the TSC service indication information to the base station. The TSC service indication information includes a TSC clock accuracy indication or an indication of whether the service carried by the user equipment (UE) is a TSC service.

In one embodiment, the second receiving unit 210 is configured to receive the clock information sent by the base station through broadcasting, receive the clock information sent by the base station through dedicated signaling, and receive the periodic clock information broadcast indication sent by the base station through the dedicated signaling and trigger the clock information sent by the base station through broadcasting to be received based on the clock information broadcast indication.

In one embodiment, the fifth sending unit is configured to send the TSC service indication information to the base station in any one of the following manners: an RLC state package, a MAC CE, a MAC preamble, a PDCP state package, or an RRC message.

Figure 30:
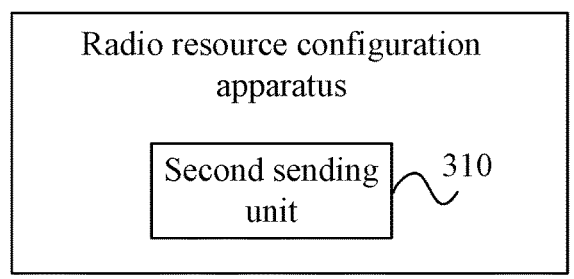
FIG. 30 is a block diagram illustrating the structure of a radio resource configuration apparatus applied to an AMF according to embodiments of the present application.

FIG. 30 is a block diagram illustrating the structure of a radio resource configuration apparatus applied to an AMF according to embodiments of the present application. As shown in FIG. 30, the radio resource configuration apparatus applied to an AMF according to embodiments of the present application includes a second sending unit 310 configured to send TSC service indication information to the base station. The TSC service indication information includes a TSC clock accuracy indication or an indication of whether the service carried by the user equipment (UE) is a TSC service.

In one embodiment, the second sending unit 310 is configured to send the TSC service indication information in any one of the following manners: the dedicated signaling of an NG interface or the common signaling of the NG interface.

In one embodiment, the base station includes a gNB-CU. The second sending unit 310 is configured to send the TSC service indication information to the gNB-CU.

Figure 31:
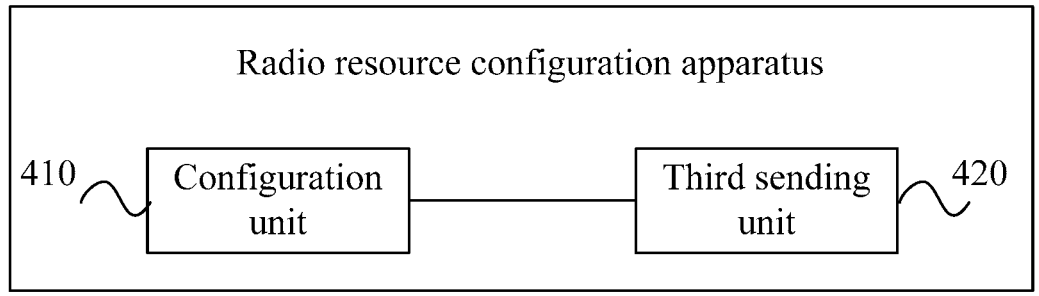
FIG. 31 is a block diagram illustrating the structure of a radio resource configuration apparatus applied to a base station according to embodiments of the present application.

FIG. 31 is a block diagram illustrating the structure of a radio resource configuration apparatus applied to a base station according to embodiments of the present application. As shown in FIG. 31, the radio resource configuration apparatus applied to a base station according to embodiments of the present application includes a configuration unit 410 and a third sending unit 420.

The configuration unit 410 is configured to configure a mapping relationship between a semi-persistent resource configuration index and a semi-persistent resource group identity for a UE. The third sending unit 420 is configured to send an activation instruction or a deactivation instruction to the UE and activate or deactivate a semi-persistent resource configuration for the semi-persistent resource group identity through the activation instruction or the deactivation instruction.

In one embodiment, the semi-persistent resource configuration index includes a semi-persistent scheduling (SPS) configuration index or a configured grant (CG) configuration index.

In one embodiment, the mapping relationship between the semi-persistent resource configuration index and the semi-persistent resource group identity includes a mapping relationship between one semi-persistent resource group identity and a plurality of semi-persistent resource configuration indexes. Each semi-persistent resource configuration corresponds to the value range of at least one process identity. The value range includes the at least one process identity. Alternatively, the value range includes the starting value of the process identity and the number of processes.

In one embodiment, the mapping relationship between the semi-persistent resource configuration index and the semi-persistent resource group identity includes a mapping relationship between one semi-persistent resource configuration index and a plurality of semi-persistent resource group identities. Each semi-persistent resource configuration corresponds to the value range of at least one process identity. The value range includes the at least one process identity.

Alternatively, the value range includes the starting value of the process identity and the number of processes.

In one embodiment, the configuration unit 410 is configured to map the semi-persistent resource configuration index to the semi-persistent resource group identity through a MAC CE or RRC dedicated signaling.

In one embodiment, the third sending unit 420 is configured to use the downlink control information (DCI) to send the information of the semi-persistent resource configuration index or the information of the semi-persistent resource group identity, and activate or deactivate the semi-persistent resource configuration for the semi-persistent resource configuration index or the semi-persistent resource group identity based on the activation instruction or the deactivation instruction.

In one embodiment, in the configuration unit 410, the index value of a semi-persistent resource group identity is configured using one of the following strategies: In the semi-persistent resource configuration information, the index value of the semi-persistent resource group identity is configured as the index value of a semi-persistent resource group identity in the DCI; or in the semi-persistent resource configuration information, the index value of the semi-persistent resource group identity is configured as the difference between the index value of a semi-persistent resource group identity in the DCI and a predefined offset value.

In one embodiment, the configuration unit 410 is configured to, in the value range of semi-persistent resource configuration indexes and semi-persistent resource group identities that are carried by the DCI, set each of A values in a first part in the value range to be the index value of a semi-persistent resource configuration index and set each of B values in a second part in the value range to be the index value of a semi-persistent resource group identity. A and B are positive integers. The first part and the second part do not overlap each other.

In one embodiment, the configuration unit 410 includes a configuration sub-unit. The configuration sub-unit is configured to configure one or more sets of semi-persistent resource configurations for each semi-persistent resource configuration index. Each set of semi-persistent resource configurations corresponds to the value range of at least one process identity. The value range includes the at least one process identity. Alternatively, the value range includes the starting value of the process identity and the number of processes.

In one embodiment, the configuration sub-unit is configured to configure one or more sets of semi-persistent resource configurations for each semi-persistent resource configuration index through the RRC dedicated signaling.

In one embodiment, the configuration sub-unit is configured to configure the starting value of the process identity and the number of the processes for each semi-persistent resource configuration or each set of semi-persistent resources in each semi-persistent resource configuration and, in an application scenario corresponding to each semi-persistent resource configuration or each set of semi-persistent resources in each semi-persistent resource configuration, calculate a process identity corresponding to a semi-persistent resource time-domain position based on the starting value of the process identity and the number of the processes. The application scenario of each set of the semi-persistent resources includes at least one of the following scenarios: Each set of semi-persistent resources is configured as SPS, and the period of each semi-persistent resource configuration is in slots, subframes, milliseconds, or Hertz; or each set of semi-persistent resources is configured as CG.

In one embodiment, the configuration sub-unit is configured to calculate the process identity corresponding to the semi-persistent resource position based on the time-domain information of the current time-domain position of each set of semi-persistent resources, the number of slots in each radio frame, the number of slots in the current frame, the starting value of the process identity, the period of each semi-persistent resource configuration, and the number of the processes; or calculate the process identity corresponding to the semi-persistent resource position based on the number of slots in each radio frame, the time-domain information of the starting time-domain position of each semi-persistent resource configuration, the resource position number, the starting value of the process identity, the period of each semi-persistent resource configuration, and the number of the processes.

In one embodiment, the current time-domain position is an NR time-domain position represented by at least one of the following manners: a system superframe number, a system frame number, a slot number, or a symbol number. The starting time-domain position of each semi-persistent resource configuration includes at least one of: the absolute time-domain position configured through dedicated signaling, the relative time-domain position that is offset by M time units relative to the DCI activation command receiving moment, or the time-domain position jointly determined based on the time-domain offset configured by the dedicated signaling and the offset of M time units relative to the DCI activation command receiving moment. M is a non-negative integer. One of the time units may be a radio frame, a subframe, a slot, or a symbol.

Figure 32:
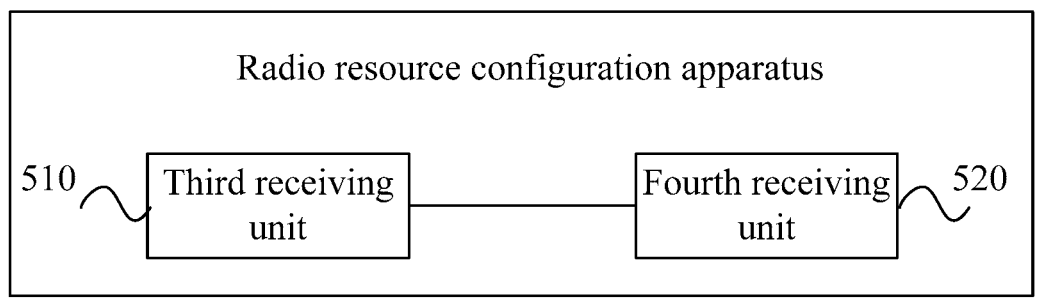
FIG. 32 is a block diagram illustrating the structure of a radio resource configuration apparatus applied to a UE according to embodiments of the present application.

FIG. 32 is a block diagram illustrating the structure of a radio resource configuration apparatus applied to a UE according to embodiments of the present application. As shown in FIG. 32, the radio resource configuration apparatus applied to a UE according to embodiments of the present application includes a third receiving unit 510 and a fourth receiving unit 520. The third receiving unit 510 is configured to receive semi-persistent resource configuration information. The semi-persistent resource configuration information includes a mapping relationship between a semi-persistent resource configuration index and a semi-persistent resource group identity. The fourth receiving unit 520 is configured to receive an activation instruction or a deactivation instruction and activate or deactivate a semi-persistent resource configuration for the semi-persistent resource group identity through the activation instruction or the deactivation instruction.

In one embodiment, the semi-persistent resource configuration index includes a semi-persistent scheduling (SPS) configuration index or a configured grant (CG) configuration index.

In one embodiment, the mapping relationship between the semi-persistent resource configuration index and the semi-persistent resource group identity includes a mapping relationship between one semi-persistent resource group identity and a plurality of semi-persistent resource configuration indexes. Each semi-persistent resource configuration corresponds to the value range of at least one process identity. The value range includes the at least one process identity. Alternatively, the value range includes the starting value of the process identity and the number of processes.

In one embodiment, the mapping relationship between the semi-persistent resource configuration index and the semi-persistent resource group identity includes a mapping relationship between one semi-persistent resource configuration index and a plurality of semi-persistent resource group identities. Each semi-persistent resource configuration corresponds to the value range of at least one process identity. The value range includes the at least one process identity. Alternatively, the value range includes the starting value of the process identity and the number of processes.

In one embodiment, the third receiving unit 510 is configured to receive the semi-persistent resource configuration information through a MAC CE or RRC dedicated signaling.

In one embodiment, the fourth receiving unit 520 is configured to acquire the information of the semi-persistent resource configuration index or the information of the semi-persistent resource group identity, where the information of the semi-persistent resource configuration index or the information of the semi-persistent resource group identity is carried by DCI, and activate or deactivate the semi-persistent resource configuration for the semi-persistent resource configuration index or the semi-persistent resource group identity based on the activation instruction or the deactivation instruction.

In one embodiment, the index value of a semi-persistent resource group identity is configured using one of the following strategies: In the semi-persistent resource configuration information, the index value of a semi-persistent resource group identity in the DCI is taken as the index value of the semi-persistent resource group identity; or in the semi-persistent resource configuration information, the difference between the index value of a semi-persistent resource group identity in the DCI and a predefined offset value is taken as the index value of the semi-persistent resource group identity.

In one embodiment, the fourth receiving unit 510 is configured to, in the value range of semi-persistent resource configuration indexes and semi-persistent resource group identities that are carried by the DCI, acquire A bit values in a first part in the value range, set each of the A bit values to be the index value of a semi-persistent resource configuration index, acquire B bit values in a second part in the value range, and set each of the B bit values to be the index value of a semi-persistent resource group identity. A and B are positive integers. The first part and the second part do not overlap each other.

In one embodiment, each semi-persistent resource configuration index corresponds to one or more sets of semi-persistent resources. Each set of semi-persistent resource configurations corresponds to the value range of at least one process identity. The value range includes the at least one process identity. Alternatively, the value range includes the starting value of the process identity and the number of processes.

In one embodiment, the apparatus further includes a sixth receiving unit. The sixth receiving unit is configured to receive the RRC dedicated signaling. The RRC dedicated signaling carries one or more sets of semi-persistent resource configurations corresponding to each semi-persistent resource configuration index.

In one embodiment, the apparatus further includes a calculation unit. The calculation unit is configured to, in an application scenario corresponding to each semi-persistent resource configuration or each set of semi-persistent resources in each semi-persistent resource configuration, calculate a process identity corresponding to a semi-persistent resource time-domain position based on the starting value of the process identity and the number of the processes. The application scenario of each set of the semi-persistent resources includes at least one of the following scenarios: Each set of semi-persistent resources is configured as SPS, and the period of each semi-persistent resource configuration is in slots, subframes, milliseconds, or Hertz; or each set of semi-persistent resources is configured as CG.

In one embodiment, the calculation unit is configured to calculate the process identity corresponding to the semi-persistent resource time-domain position based on the starting value of the process identity and the number of the processes, including that the process identity corresponding to the semi-persistent resource position is calculated based on the time-domain information of the current time-domain position of each set of semi-persistent resources, the number of slots in each radio frame, the number of slots in the current frame, the starting value of the process identity, the period of each semi-persistent resource configuration, and the number of the processes or that the process identity corresponding to the semi-persistent resource position is calculated based on the number of slots in each radio frame, the time-domain information of the starting time-domain position of each semi-persistent resource configuration, the resource position number, the starting value of the process identity, the period of each semi-persistent resource configuration, and the number of the processes.

In one embodiment, the current time-domain position is an NR time-domain position represented by at least one of the following manners: a system superframe number, a system frame number, a slot number, or a symbol number. The starting time-domain position of each semi-persistent resource configuration includes at least one of: the absolute time-domain position configured through dedicated signaling, the relative time-domain position that is offset by M time units relative to the DCI activation command receiving moment, or the time-domain position jointly determined based on the time-domain offset configured by the dedicated signaling and the offset of M time units relative to the DCI activation command receiving moment. M is a non-negative integer. One of the time units may be a radio frame, a subframe, a slot, or a symbol.

Figure 33:
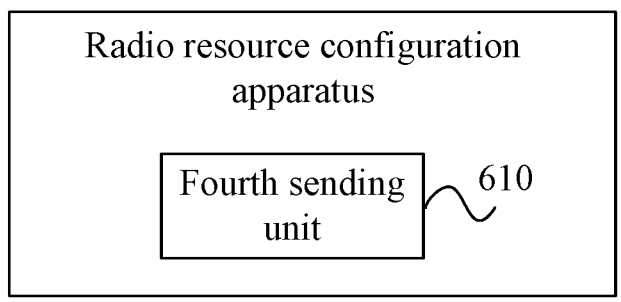
FIG. 33 is a block diagram illustrating the structure of a radio resource configuration apparatus applied to a base station according to embodiments of the present application.

FIG. 33 is a block diagram illustrating the structure of a radio resource configuration apparatus applied to a base station according to embodiments of the present application. As shown in FIG. 33. The radio resource configuration apparatus applied to a base station according to embodiments of the present application includes a fourth sending unit 610. The fourth sending unit 610 is configured to send a specified measurement period of a to-be-measured cell to a UE. The specified measurement period is configured for indicating the UE carrying a TSC service to perform a radio quality measurement within the specified measurement period. The specified measurement period includes a measurement signal sending occasion sequence and a measurement time window.

In one embodiment, the fourth sending unit 610 is configured to send the specified measurement period of the to-be-measured cell to the UE through dedicated signaling or a broadcast mechanism. In one embodiment, the measurement time window includes at least one of the measurement interval information, the length of a measurement gap, or the measurement starting offset information. The measurement interval information refers to the interval of measurement gaps or the repetition period of measurement gaps. The measurement interval information includes that one measurement gap is configured at an interval of L time units. A time unit of the L time units includes any one of a measurement signal interval, a symbol, a slot, a subframe, a radio frame, a millisecond, or a second. L is a positive integer. The length of a measurement gap includes K time units. A time unit of the K time units includes any one of a measurement signal interval, a symbol, a slot, or a subframe. K is a positive integer. The measurement starting offset information includes the configuration information configured for determining a measurement starting occasion.

In one embodiment, the measurement signal sending occasion sequence includes at least one of the following: the sending time-domain position of a measurement signal, a sending interval, or the sending duration of a measurement signal.

In one embodiment, the to-be-measured cell includes a to-be-measured target cell and/or a to-be-measured neighbor cell set. The to-be-measured cell is configured for carrying the TSC service. Moreover, clock information satisfies synchronization at an ns level.

Figure 34:
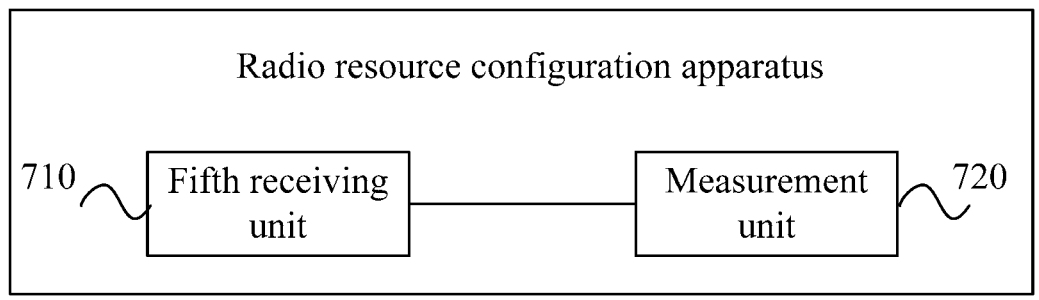
FIG. 34 is a block diagram illustrating the structure of a radio resource configuration apparatus applied to a UE according to embodiments of the present application.

FIG. 34 is a block diagram illustrating the structure of a radio resource configuration apparatus applied to a UE according to embodiments of the present application. As shown in FIG. 34, the radio resource configuration apparatus applied to a UE according to embodiments of the present application includes a fifth receiving unit 710 and a measurement unit 720. The fifth receiving unit 710 is configured to receive the information about a specified measurement period of a to-be-measured cell. The specified measurement period includes a measurement signal sending occasion sequence and a measurement time window. The measurement unit 720 is configured to perform a radio quality measurement in the specified measurement period.

In one embodiment, the fifth receiving unit 710 is configured to receive the specified measurement period of the to-be-measured cell through dedicated signaling or a broadcast mechanism.

In one embodiment, the measurement time window includes at least one of the measurement interval information, the length of a measurement gap, or the measurement starting offset information. The measurement interval information refers to the interval of measurement gaps or the repetition period of measurement gaps. The measurement interval information includes that one measurement gap is configured at an interval of L time units. A time unit of the L time units includes any one of a measurement signal interval, a symbol, a slot, a subframe, a radio frame, a millisecond, or a second. L is a positive integer. The length of a measurement gap includes K time units. A time unit of the K time units includes any one of a measurement signal interval, a symbol, a slot, or a subframe. K is a positive integer. The measurement starting offset information includes the configuration information configured for determining a measurement starting occasion.

In one embodiment, the measurement signal sending occasion sequence includes at least one of the following: the sending time-domain position of a measurement signal, a sending interval, or the sending duration of a measurement signal.

In one embodiment, the to-be-measured cell includes a to-be-measured target cell and/or a to-be-measured neighbor cell set. The to-be-measured cell is configured for carrying the TSC service.

Moreover, clock information satisfies synchronization at an ns level.

For functions of various units in the radio resource configuration apparatus in embodiments of the present application, refer to the related description on the preceding methods, which is not repeated here.

Figure 35:
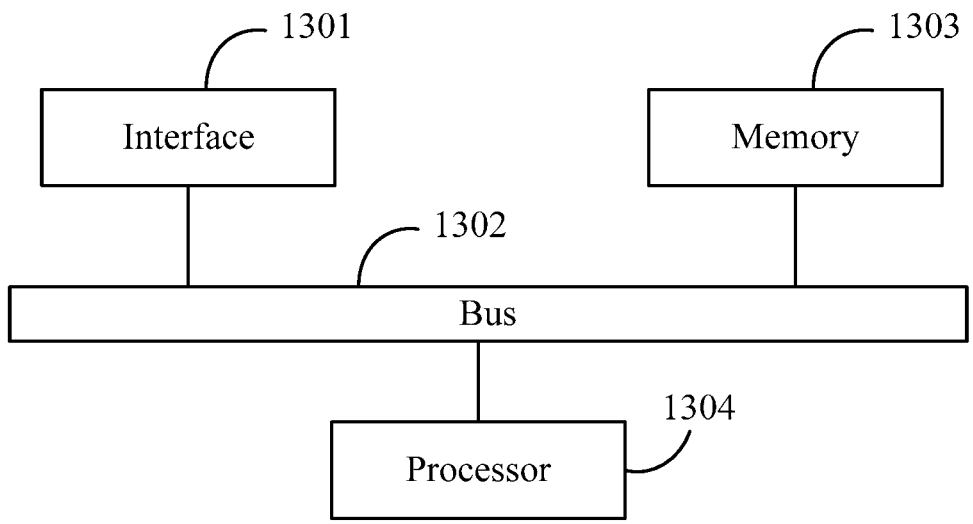
FIG. 35 is a diagram illustrating the structure of a user equipment/user terminal according to embodiments of the present application.

FIG. 35 is a diagram illustrating the structure of a user equipment/user terminal according to embodiments of the present application. As shown in FIG. 35, the user equipment/user terminal 130 provided in embodiments of the present application includes a memory 1303 and a processor 1304. The user equipment/user terminal 130 may further include an interface 1301 and a bus 1302. The interface 1301, the memory 1303, and the processor 1304 are connected through the bus 1302. The memory 1303 is configured to store instructions. The processor 1304 is configured to read the instructions to execute the technical solutions of the preceding method embodiments applied to the user equipment/user terminal. The implementation principles and technical effects are similar, which is not repeated here.

Figure 36:
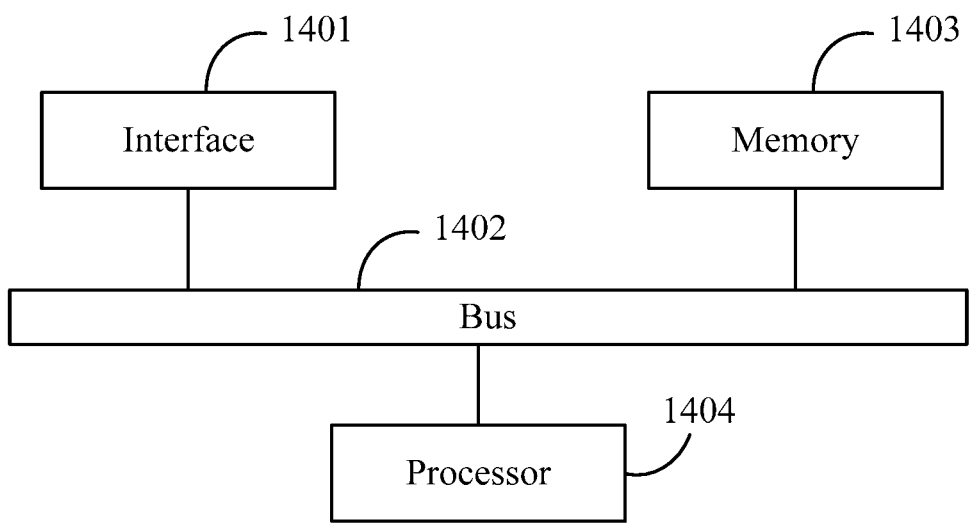
FIG. 36 is a diagram illustrating the structure of a base station according to embodiments of the present application.

FIG. 36 is a diagram illustrating the structure of a base station according to embodiments of the present application. As shown in FIG. 36, the base station provided in embodiments of the present application includes a memory 1403 and a processor 1404. The base station may further include an interface 1401 and a bus 1402. The interface 1401, the memory 1403, and the processor 1404 are connected through the bus 1402. The memory 1403 is configured to store instructions. The processor 1404 is configured to read the instructions to execute the technical solutions of the preceding embodiments applied to the base station. The implementation principles and technical effects are similar and are not repeated here.

Figure 37:
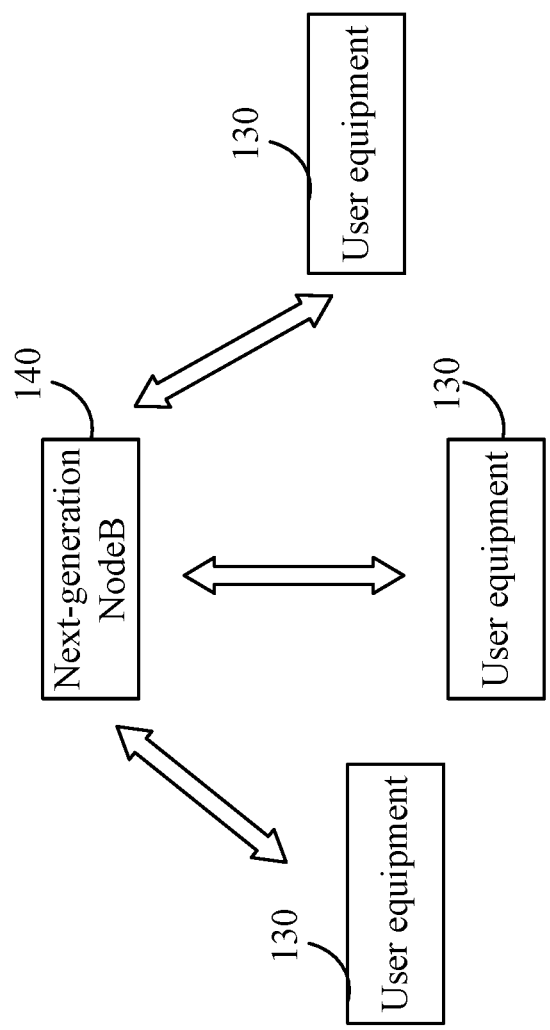
FIG. 37 is a diagram illustrating the structure of a communication system according to embodiments of the present application.

FIG. 37 is a diagram illustrating the structure of a communication system according to embodiments of the present application. As shown in FIG. 37, the system includes a user equipment 130 according to the preceding embodiments and a base station 140 according to the preceding embodiments.

The above are only exemplary embodiments of the present application and are not intended to limit the scope of the present application.

It is to be understood by those skilled in the art that the term "user terminal" covers any suitable type of radio UE, for example, a mobile phone, a portable data processing device, a portable web browser, or a vehicle-mounted mobile station.

In general, multiple embodiments of the present application may be implemented in hardware, a dedicated circuit, software, logic, or any combination thereof. For example, some aspects may be implemented in hardware while other aspects may be implemented in firmware or software that may be performed by a controller, a microprocessor, or other computing apparatuses, although the present application is not limited thereto.

Embodiments of the present application may be implemented by computer program instructions executed by a data processor of a mobile apparatus, for example, in a processor entity, may be implemented by hardware, or may be implemented by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules, and functions. Computer programs may be stored in a memory. The memory may be of any type suitable for a local technical environment and may be implemented using any suitable data storage technology.

The memory in embodiments of the present application may be a volatile memory or a non-volatile memory or may include both a volatile memory and a non-volatile memory. The non-volatile memory may be a read-only memory (ROM), a programmable ROM (PROM), an erasable PROM (EPROM), an electrically EPROM (EEPROM), a flash memory, or the like. The volatile memory may be a random-access memory (RAM), which serves as an external cache. Many forms of RAMs may be used, such as a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchlink dynamic random-access memory (SLDRAM), and a direct rambus random-access memory (DRRAM). The memory of the system and the method described in the present application includes, but is not limited to, these and any other suitable type of memory.

The processor of embodiments of the present application may be of any type suitable for the local technical environment such as, but not limited to, a general-purpose computer, a special-purpose computer, a microprocessor, a digital signal processor (DSP), an application specific integrated circuit (ASIC), a field-programmable gate array (FPGA) or any other programmable logic device, a discrete gate or transistor logic device, a discrete hardware component, or a processor based on a multi-core processor architecture. The general-purpose processor may be, for example, a microprocessor or any commonly used processor. The preceding processor may implement or execute steps of the methods in embodiments of the present application. Software modules may be located in a random-access memory, a flash memory, a read-only memory, a programmable read-only memory, an electrically erasable programmable read-only memory, a register, or any other established storage medium in the art. The storage medium is located in the memory. The processor may read information in the memory and implement the steps of the preceding methods in combination with hardware.

What is claimed is:

1. An information configuration method, comprising:
receiving, by a centralized unit (CU), time sensitive communication (TSC) service indication information from an access and mobility management function (AMF) via a UE dedicated signaling of an NG interface,
sending, by the CU, the TSC service indication information to a distributed unit (DU) via a UE dedicated signaling of an F1 interface, wherein the UE dedicated signaling of the F1 interface comprises a UE CONTEXT SETUP REQUEST signaling or a UE CONTEXT MODIFICATION REQUEST signaling,
transmitting, by the CU, a clock information request to the DU, and
receiving, by the CU, clock information from the DU in response to the clock information request or receiving, by the CU, the clock information from the DU periodically.

2. The information configuration method of claim 1, wherein the clock information comprises accurate clock information and a reference SFN corresponding to the accurate clock information, and
wherein the accurate clock information refers to the accurate clock information at the moment of the reference SFN boundary.

3. The information configuration method of claim 2, further comprising:
transmitting, by the CU, a dedicated signaling carrying the accurate clock information to the DU,
wherein the dedicated signaling is sent by the DU to a user equipment.

4. An information configuration method, comprising:
receiving, by a distributed unit (DU), time sensitive communication (TSC) service indication information from a centralized unit (CU) via a UE dedicated signaling of an F1 interface, wherein the UE dedicated signaling of the F1 interface comprises a UE CONTEXT SETUP REQUEST signaling or a UE CONTEXT MODIFICATION REQUEST signaling,
receiving, by the DU, a clock information request from the CU, and
transmitting, by the DU, clock information to the CU in response to the clock information request or transmitting, by the DU, the clock information to the CU periodically.

5. The information configuration method of claim 4, wherein the clock information comprises accurate clock information and a reference SFN corresponding to the accurate clock information,
wherein the accurate clock information refers to the accurate clock information at the moment of the reference SFN boundary.

6. The information configuration method of claim 5, further comprising:
receiving, by the DU, a dedicated signaling carrying the accurate clock information from the CU,
wherein the dedicated signaling is sent by the DU to a user equipment.

7. A communication apparatus comprising:
a processor, the processor being configured to:
receive, via a transceiver of a centralized unit (CU), time sensitive communication (TSC) service indication information from an access and mobility management function (AMF) via a UE dedicated signaling of an NG interface,
send, via the transceiver of the CU, the TSC service indication information to a distributed unit (DU) via a UE dedicated signaling of an F1 interface, wherein the UE dedicated signaling of the F1 interface comprises a UE CONTEXT SETUP REQUEST signaling or a UE CONTEXT MODIFICATION REQUEST signaling,
transmit, via the transceiver of the CU, a clock information request to the DU, and
receive, via the transceiver of the CU, clock information from the DU in response to the clock information request or receive, via the transceiver of the CU, the clock information from the DU periodically.

8. The communication apparatus of claim 7, wherein the clock information comprises accurate clock information and a reference SFN corresponding to the accurate clock information, and
wherein the accurate clock information refers to the accurate clock information at the moment of the reference SFN boundary.

9. The communication apparatus of claim 8, wherein the processor is configured to:
transmit, via the transceiver of the CU, a dedicated signaling carrying the accurate clock information to the DU,
wherein the dedicated signaling is sent by the DU to a user equipment.

10. A communication apparatus comprising:
a processor, the processor being configured to:
- receive, via a transceiver of a distributed unit (DU), time sensitive communication (TSC) service indication information from a centralized unit (CU) via a UE dedicated signaling of an F1 interface, wherein the UE dedicated signaling of the F1 interface comprises a UE CONTEXT SETUP REQUEST signaling or a UE CONTEXT MODIFICATION REQUEST signaling,
- receive, via the transceiver of the DU, a clock information request from the CU, and
- transmit, via the transceiver of the DU, clock information to the CU in response to the clock information request or transmit, via the transceiver of the DU, the clock information to the CU periodically.

11. The communication apparatus of claim 10, wherein the clock information comprises accurate clock information and a reference SFN corresponding to the accurate clock information,
- wherein the accurate clock information refers to the accurate clock information at the moment of the reference SFN boundary.

12. The communication apparatus of claim 11, wherein the processor is configured to:
- receive, via the transceiver of the DU, a dedicated signaling carrying the accurate clock information from the CU,
- wherein the dedicated signaling is sent by the DU to a user equipment.

* * * * *